United States Patent
Lahti et al.

(10) Patent No.: US 10,634,073 B2
(45) Date of Patent: Apr. 28, 2020

(54) VARIABLE GEOMETRY TURBOCHARGER FEED FORWARD CONTROL SYSTEM AND METHOD

(71) Applicant: Deere & Company, Moline, IL (US)

(72) Inventors: John L. Lahti, Cedar Falls, IA (US); Michael J. Pipho, Dunkerton, IA (US); Dustin W. Ridenour, Independence, IA (US); Michael J. Maney, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 251 days.

(21) Appl. No.: 15/900,710

(22) Filed: Feb. 20, 2018

(65) Prior Publication Data
US 2018/0187615 A1    Jul. 5, 2018

Related U.S. Application Data

(63) Continuation of application No. 14/539,473, filed on Nov. 12, 2014, now abandoned.

(51) Int. Cl.
*F02D 41/00* (2006.01)
*F02M 26/22* (2016.01)
(Continued)

(52) U.S. Cl.
CPC .......... *F02D 41/0007* (2013.01); *F02B 37/24* (2013.01); *F02M 26/22* (2016.02);
(Continued)

(58) Field of Classification Search
CPC .................... F02B 37/013; F02B 37/24; F02D 2041/1416; F02D 2041/1433;
(Continued)

(56) References Cited

U.S. PATENT DOCUMENTS

| 5,715,796 A | 2/1998 | Suzuki et al. |
| 6,035,640 A | 3/2000 | Kolmanovsky et al. |

(Continued)

FOREIGN PATENT DOCUMENTS

FR    2973441    * 10/2012    ............ F02D 21/08

OTHER PUBLICATIONS

Office Action for U.S. Appl. No. 14/539,547 dated Dec. 7, 2016 (17 pages).

(Continued)

*Primary Examiner* — Carl C Staubach
(74) *Attorney, Agent, or Firm* — Michael Best & Friedrich LLP

(57) ABSTRACT

A variable geometry turbocharger control method includes monitoring parameters of an engine using a plurality of sensors and generating engine state estimates using an engine observer model. The engine observer model represents the intake manifold volume, the exhaust manifold volume, and the charge air cooler volume. The engine state estimates are based on the monitored engine parameters from the plurality of sensors. The method also includes calculating a turbine intake correction factor based on the differences between the measured engine states and the engine state estimates and inputting the turbine intake correction factor to the engine observer model. The method further includes determining a desired turbocharger vane position based on setpoint commands, the monitored engine parameters, the turbine intake correction factor, and the engine state estimates. The method additionally includes adjusting positions of the vanes of the variable geometry turbocharger based on the desired turbocharger vane position.

11 Claims, 9 Drawing Sheets

(51) Int. Cl.
*F02B 37/24* (2006.01)
*F02D 41/14* (2006.01)
*F02B 37/013* (2006.01)

(52) U.S. Cl.
CPC ........ *F02B 37/013* (2013.01); *F02D 41/0072* (2013.01); *F02D 41/0077* (2013.01); *F02D 41/145* (2013.01); *F02D 41/1445* (2013.01); *F02D 2041/1416* (2013.01); *F02D 2041/1433* (2013.01); *F02D 2041/1434* (2013.01); *Y02T 10/144* (2013.01)

(58) Field of Classification Search
CPC ......... F02D 2041/1434; F02D 41/0007; F02D 41/0072; F02D 41/0077; F02D 41/1445; F02D 41/145; F02M 26/22; Y02T 10/144
See application file for complete search history.

(56) References Cited

U.S. PATENT DOCUMENTS

| | | | |
|---|---|---|---|
| 6,256,575 B1 | 7/2001 | Sans | |
| 6,378,515 B1 | 4/2002 | Geyer | |
| 6,804,601 B2 | 10/2004 | Wang et al. | |
| 6,805,095 B2 | 10/2004 | Sun et al. | |
| 7,076,955 B2 | 7/2006 | Herz et al. | |
| 7,155,334 B1 | 12/2006 | Stewart et al. | |
| 7,467,614 B2 | 12/2008 | Stewart et al. | |
| 7,512,479 B1 | 3/2009 | Wang | |
| 7,540,151 B2 | 6/2009 | Boehm et al. | |
| 7,698,049 B2 | 4/2010 | Whitney et al. | |
| 7,770,392 B2 | 8/2010 | Birkner et al. | |
| 7,980,221 B2 | 7/2011 | Baur et al. | |
| 8,381,519 B2 | 2/2013 | Singh et al. | |
| 8,463,531 B2 | 6/2013 | Ramappan et al. | |
| 9,297,319 B2 | 3/2016 | Wang et al. | |
| 2004/0079342 A1 | 4/2004 | Kojima et al. | |
| 2004/0084015 A1* | 5/2004 | Sun | F02D 35/0007 123/399 |
| 2005/0137777 A1 | 6/2005 | Kolavennu et al. | |
| 2006/0235603 A1 | 10/2006 | Kobayashi et al. | |
| 2007/0068159 A1 | 3/2007 | Ueno et al. | |
| 2007/0073467 A1* | 3/2007 | Hill | F02D 35/02 701/105 |
| 2007/0101977 A1 | 5/2007 | Stewart | |
| 2007/0174003 A1* | 7/2007 | Ueno | F02D 41/38 701/104 |
| 2009/0114369 A1 | 5/2009 | Kammerzell | |
| 2009/0255517 A1 | 10/2009 | Ishikawa et al. | |
| 2010/0101226 A1 | 4/2010 | Shutty et al. | |
| 2011/0023848 A1* | 2/2011 | Schwarte | F02B 37/001 123/568.21 |
| 2011/0088674 A1 | 4/2011 | Shutty et al. | |
| 2011/0154820 A1 | 6/2011 | Osburn et al. | |
| 2011/0154821 A1 | 6/2011 | Evans-Beauchamp | |
| 2012/0024270 A1 | 2/2012 | Wang et al. | |
| 2012/0173118 A1 | 7/2012 | Wang et al. | |
| 2012/0222417 A1 | 9/2012 | Fontvieille et al. | |
| 2013/0013169 A1 | 1/2013 | Eser et al. | |
| 2013/0074492 A1 | 3/2013 | Chi et al. | |
| 2013/0080034 A1 | 3/2013 | Chi et al. | |
| 2014/0000573 A1* | 1/2014 | Hu | F02D 41/0007 123/568.19 |
| 2014/0109570 A1 | 4/2014 | Hu et al. | |
| 2014/0207361 A1 | 7/2014 | Iemura | |
| 2015/0330326 A1 | 11/2015 | Shaver et al. | |
| 2015/0354483 A1 | 12/2015 | Brewbaker et al. | |
| 2016/0131057 A1 | 5/2016 | Lahti et al. | |
| 2016/0131089 A1 | 5/2016 | Lahti et al. | |
| 2016/0146130 A1 | 5/2016 | Haskara et al. | |
| 2016/0326974 A1 | 11/2016 | Lahti et al. | |
| 2017/0051684 A1 | 2/2017 | Lahti et al. | |

OTHER PUBLICATIONS

Office Action for U.S. Appl. No. 14/539,473 dated Mar. 30, 2017 (21 pages).
Office Action for U.S. Appl. No. 14/832,227 dated May 3, 2017 (19 pages).
Office Action for U.S. Appl. No. 14/539,473 dated Oct. 20, 2017 (27 pages).

* cited by examiner

VARIABLE GEOMETRY TURBOCHARGER FEED FORWARD CONTROL SYSTEM AND METHOD

FIELD OF THE DISCLOSURE

The present disclosure relates to engine control systems and methods and more particularly to a variable geometry turbocharger control system with feed forward control that can run in the engine control unit (ECU) in real time.

BACKGROUND

A variable geometry turbocharger (VGT) vane controller can be used to provide sufficient boost to provide the fresh air flow needed to prevent high levels of particulate matter (PM) emissions, and to provide sufficient exhaust manifold pressure to provide the exhaust gas recirculation (EGR) flow needed to prevent high levels of nitrogen oxides (NOx) emissions. It may be desirable to improve engine efficiency by minimizing pumping losses, so the VGT vanes can be adjusted to provide just enough pressure and flow without causing excessive throttling at the air throttle or EGR valve.

Traditional engine controllers use proportional-integral-derivative (PID) controls to calculate a desired position for the variable geometry turbocharger (VGT) vanes, in addition to a second PID position controller which regulates the pulse width modulated (PWM) duty cycle to the actuator motor. This can require a lot of protections to be built into the controls to prevent compressor surge, turbo over-speed, high exhaust manifold pressures, valve float due to engine delta pressure, and closing the VGT vanes beyond the peak power point. All of these protections and limits can require a significant amount of calibration effort.

It would be desirable to integrate a plurality of these constraints and protections into a control system or method that determines a desired exhaust manifold pressure, and determines a VGT vane position that achieves the desired exhaust manifold pressure using a feed forward model.

SUMMARY

A variable geometry turbocharger control method is disclosed for an engine having an air system with a variable geometry turbocharger with adjustable vanes. The control method includes monitoring parameters of the engine using a plurality of sensors; modeling the air system and generating engine state estimates using an engine observer model; generating measured engine states based on the monitored engine parameters from the plurality of sensors; computing an observer error based on the differences between the measured engine states and the engine state estimates; generating model corrections based on the observer error; generating a desired turbocharger vane position based on setpoint commands, the monitored engine parameters, the model corrections and the engine state estimates; and adjusting positions of the vanes of the variable geometry turbocharger based on the desired turbocharger vane position. The model corrections are input to the engine observer model. Generating a desired turbocharger vane position can be performed using an inverse engine model, where the inverse engine model is an inverse of the engine observer model. The variable geometry turbocharger control method can also include generating feedback actuator commands based on the setpoint commands and the engine state estimates; and using the feedback actuator commands in generating the desired turbocharger vane position.

The air system can also include an intake manifold, an exhaust manifold and an exhaust gas recirculation (EGR) cooler; where exhaust gasses from the engine flow through the exhaust manifold and into the EGR cooler or the variable geometry turbocharger; and exhaust gasses from the EGR cooler flow through the intake manifold and into the engine. In this case, the method can also include calculating a desired EGR rich mass flow; calculating a desired exhaust manifold pressure; calculating a desired turbine mass flow through the variable geometry turbocharger based on the desired exhaust manifold pressure; and determining the desired turbocharger vane position based on the desired turbine mass flow. Calculating a desired EGR rich mass flow can include calculating a desired intake manifold EGR rich mass fraction; calculating a desired rich mass flow into the engine cylinders; and calculating the desired EGR rich mass flow based on the product of the desired intake manifold EGR rich mass fraction and the desired rich mass flow into the engine cylinders. Calculating a desired intake manifold EGR rich mass fraction can include calculating a desired intake manifold diluent rich mass fraction based on a desired engine rich fuel-to-air ratio and a desired engine diluent-to-air ratio.

The air system can also include an EGR valve controlling flow through the EGR cooler, where the EGR valve has a maximum valve open position. In this case, the method can also include calculating a desired EGR valve position. When the desired EGR valve position is less than the maximum valve open position, a minimum exhaust manifold pressure can be calculated based on the desired EGR rich mass flow and a desired intake manifold rich pressure. When the desired EGR valve position is not less than the maximum valve open position, the minimum exhaust manifold pressure can be calculated based on a desired EGR mass flow and a current intake manifold pressure.

Calculating a desired exhaust manifold pressure can include calculating an unlimited desired exhaust manifold pressure based on a desired intake manifold pressure and a previous desired exhaust manifold pressure. The unlimited desired exhaust manifold pressure can be limited to the maximum of the calculated unlimited desired exhaust manifold pressure, the minimum exhaust manifold pressure for necessary EGR mass flow, and a minimum exhaust manifold pressure for engine performance. The unlimited desired exhaust manifold pressure can be limited to the minimum of the calculated unlimited desired exhaust manifold pressure, a maximum exhaust manifold pressure for engine delta pressure protection, and a maximum exhaust manifold pressure for engine component protection.

Calculating a desired turbine mass flow can include calculating an exhaust manifold pressure error as the difference between the calculated desired exhaust manifold pressure and the calculated exhaust manifold pressure from the engine observer model; calculating a closed loop turbine mass flow based on the exhaust manifold pressure error; determining a feed forward turbine mass flow based on the difference between a mass flow out of the engine cylinders and an EGR mass flow determined by the engine observer model; and calculating the desired turbine mass flow based on the closed loop turbine mass flow and the feed forward turbine mass flow.

Generating model corrections based on the observer error can include generating a turbine mass flow correction factor based on the difference between a modelled exhaust manifold pressure from the engine observer model and a measured exhaust manifold pressure from the plurality of sensors.

The air system can include an exhaust manifold, an intake manifold and a low pressure turbine, where exhaust gasses from the engine flow through the exhaust manifold and into the intake manifold or the variable geometry turbocharger; and exhaust gasses from the variable geometry turbocharger flow through the low pressure turbine. In this case, determining the desired turbocharger vane position can include determining a desired turbine mass flow; initializing a current desired vane position; finding a turbine interstage pressure between the variable geometry turbocharger and the low pressure turbine for the current desired vane position that produces the same or closest to the same mass flows through the variable geometry turbocharger and the low pressure turbine; comparing the desired turbine mass flow to an average mass flow through the variable geometry turbocharger and the low pressure turbine for the found turbine interstage pressure; adjusting the current desired vane position based on the comparison between the desired turbine mass flow and the average mass flow through the variable geometry turbocharger and the low pressure turbine; and repeating the finding, comparing and adjusting steps to determine the desired turbocharger vane position. The turbine mass flow correction factor can be used to correct the mass flows through the variable geometry turbocharger and the low pressure turbine used in finding the turbine interstage pressure.

A variable geometry turbocharger control system is disclosed for an engine having an air system with a variable geometry turbocharger having adjustable vanes. The control system includes a plurality of sensors for monitoring engine parameters of the engine; an engine observer for modeling the air system and generating engine state estimates; a comparator for generating measured engine states based on the engine parameters from the plurality of sensors, and computing an observer error based on the differences between the measured engine states and the engine state estimates; an observer controller for generating model corrections based on the observer error; and an inverse engine model for generating actuator commands based on setpoint commands, the engine parameters from the plurality of sensors, the model corrections and the engine state estimates. The model corrections are input to the engine observer. The positions of the vanes of the variable geometry turbocharger are adjusted based on the actuator commands. The engine observer, the comparator, the observer controller, and the inverse engine model can be run on an electronic control unit of the engine.

The variable geometry turbocharger control system can also include a feedback controller for generating feedback actuator commands based on the setpoint commands and the engine state estimates. In this case, the positions of the vanes of the variable geometry turbocharger would be adjusted based on the actuator commands and the feedback actuator commands.

The air system can also include an intake manifold, an exhaust manifold, an exhaust gas recirculation (EGR) cooler, and a low pressure turbine, where exhaust gasses from the engine flow through the exhaust manifold and into the EGR cooler or the variable geometry turbocharger, exhaust gasses from the EGR cooler flow through the intake manifold and back into the engine, and exhaust gasses from the variable geometry turbocharger flow through the low pressure turbine. In this case, the control system can also include a turbine mass flow module for calculating a desired turbine mass flow based on a desired EGR mass flow and a desired exhaust manifold pressure. The desired turbine mass flow can be used in calculating the actuator commands. The variable geometry turbocharger control system can also include an interstage pressure search module and a vane position adjustment module. The interstage pressure search module can find an interstage pressure between the variable geometry turbocharger and the low pressure turbine for a current turbocharger vane position that provides the same or closest to the same mass flow through the variable geometry turbocharger and the low pressure turbine. The vane position adjustment module can adjust the current turbocharger vane position based on a comparison between the desired turbine mass flow and the average mass flow through the variable geometry turbocharger and the low pressure turbine for the interstage pressure found by the interstage pressure search module. The adjusted turbocharger vane position found by the vane position adjustment module can be used in calculating the actuator commands. The observer controller can generate a turbine mass flow correction factor based on the difference between the modelled and measured exhaust manifold pressures, and the turbine mass flow correction factor can be used by the interstage pressure search module.

The above and other features will become apparent from the following description and the attached drawings.

BRIEF DESCRIPTION OF THE DRAWINGS

The detailed description of the drawing refers to the accompanying figures in which.

DETAILED DESCRIPTION

A variable geometry turbocharger (VGT) vane controller can be used to provide sufficient boost to provide the fresh air flow needed to prevent high levels of particulate matter (PM) emissions, and to provide sufficient exhaust manifold pressure to provide the exhaust gas recirculation (EGR) flow needed to prevent high levels of nitrogen oxides (NOx) emissions. It may be desirable to improve engine efficiency by minimizing pumping losses, so the VGT vanes can be adjusted to provide just enough pressure and flow without causing excessive throttling at the air throttle or EGR valve. A physics based control strategy can be used to calculate a desired exhaust manifold pressure and then use feed forward controls to adjust the VGT vanes to achieve that pressure. A state observer can be used to model the air system states. Measured states can be compared to estimated states and corrections can be made to the observer model to minimize errors. The model information and model corrections can be used in turbocharger optimization and feed forward calculations. The feed forward control method can provide fast, accurate, and efficient control under a wide range of operating conditions.

Figure 1:
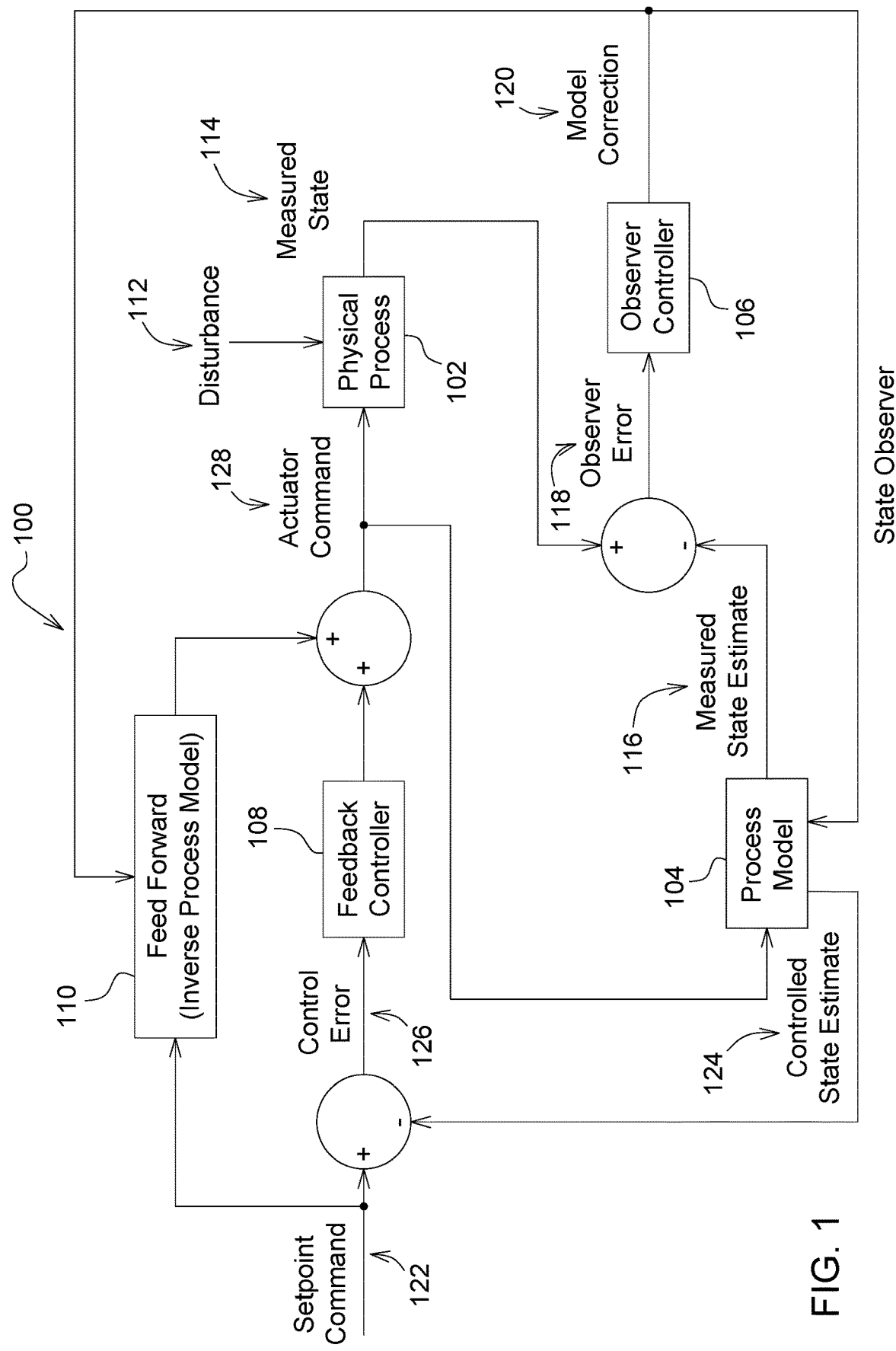
FIG. 1 illustrates an exemplary observer based control system including a physical process and a process model.

A state observer is a math model of a process that is being controlled. The model can be run in an electronic control unit (ECU) of an engine. FIG. 1 illustrates an exemplary observer based control system 100 that includes a physical process 102 and a process model 104. The process model 104 calculates state estimates, for example pressures, temperatures, speeds, and positions. Measured states from the physical process 102 can be compared with the state estimates from the process model 104, and corrections can be made based on the differences.

The exemplary observer based control system 100 includes the physical process 102 that is being modeled by the process model 104, as well as an observer controller 106, a feedback controller 108 and a feed forward controller 110. The feed forward controller 110 is an inverse of the process model 104. The process model 104 is not a perfect model of the physical process 102 which experiences disturbances 112 that are not accounted for by the process model 104. Sensors monitoring the physical process 102 provide a measured state 114, and the process model 104 outputs a measured state estimate 116. The difference between the measured state 114 and the measured state estimate 116 provides an observer error 118 that is input to the observer controller 106. The observer controller 106 processes the observer error 118 and generates a model correction 120 that is input to the process model 104 and to the feed forward controller 110. Setpoint commands 122 indicating desired values for process parameters are input to the control system 100. The setpoint commands 122 are input to the feed forward controller 110. The difference between the setpoint commands 122 and a controlled state estimate 124 generated by the process model 104 produces a control error 126 that is input to the feedback controller 108. The sum of the outputs of the feedback controller 108 and the feed forward controller 110 produces actuator commands 128 that are input to the physical process 102 and the process model 104.

There are several advantages to using a state observer within a control system. The observer can provide estimates of states that are difficult, expensive, or impossible to measure directly. Since the process model 104 provides state estimates, fewer sensors may be required. The process model 104 with corrections from the observer controller 106 can be used in the feed forward calculation 110 for the actuator commands 128. This inverse process model 110 has desired states or setpoints 122 as the inputs, and the corresponding actuator commands 128 are the outputs. Feed forward control of this type provides fast response and can reduce the feedback control complexity. This method can make it easier to implement system constraints because the constraints may be treated as limits within the feed forward and feedback control eliminating the need for separate controllers modifying the actuator commands. Using an observer in the control system may also improve operation in non-standard conditions because the model can predict the effects of changes and adjust the controls as needed.

Since the observer model runs in the ECU, it needs to be efficient at calculating state estimates. Finite element models and one-dimensional wave dynamic models are typically too complex to run within the ECU at real time. Models capable or running within the ECU or in off line simulations with sufficient fidelity for use with a control system are typically mean value lumped parameter models. A mean value model calculates the mass flow through the engine as being continuous without the pulsating effects of a real engine. If needed, individual cylinder masses can be calculated for each cylinder event from the mean flow.

Flow into the engine cylinders can be predicted using the speed density method which uses engine speed and engine displacement to determine an ideal volumetric flow rate. A correction factor called the volumetric efficiency can then be applied to provide an estimate of the volumetric flow rate. Finally, the volumetric flow rate can be multiplied by the intake manifold density to determine the mass flow into the engine cylinders. This is sometimes called the speed density mass flow.

Engine manifolds and pipes can be modeled using the lumped parameter (zero dimensional) method. Using this method, the entire volume of the manifold is assumed to have uniform pressure, temperature, and mixture composition; all mass flows out of the manifold are assumed to have the same pressure, temperature, and mixture composition as the contents of the manifold; and the pipes are assumed to have no wave dynamics or transport delays.

Figure 2:
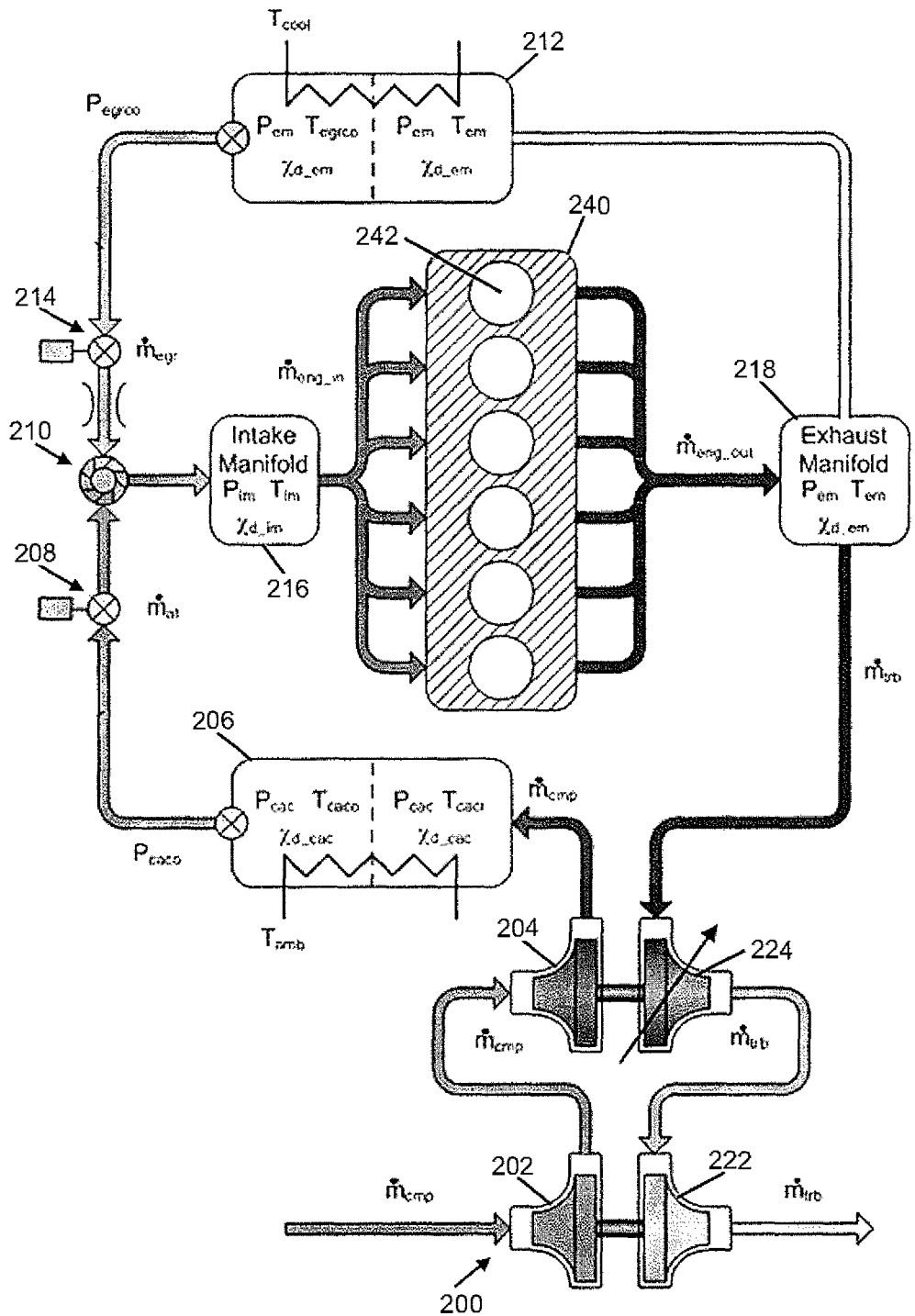
FIG. 2 illustrates some of the components, state variables, mass flows, and sensors used in an exemplary air system model.

FIG. 2 illustrates some of the components, state variables, mass flows, and sensors used in an exemplary air system model. Air enters the system at a compressor inlet 200 into a low pressure compressor 202. Sensors can be located at the compressor inlet 200 to monitor various parameters, for example compressor inlet temperature, pressure and humidity. The low pressure compressor 202 compresses the air and sends it to a high pressure compressor 204 where it is further compressed. The compressed air from the high pressure compressor 204 is input to a charge air cooler (CAC) 206. Various parameters, for example, pressure, temperature and diluent mass fraction in the CAC 206 can be monitored. The output from the CAC 206 passes through an air throttle 208 and into a mixer 210. Sensors can be positioned between the CAC 206 and the air throttle 208 to monitor the CAC outlet temperature and pressure as well as other parameters. A position sensor can be used to monitor the position of the air throttle 208.

The mixer 210 mixes fresh air from the CAC 206 and recirculated exhaust gasses from an exhaust gas recirculation (EGR) cooler 212. The mixed gasses from the mixer 210 are fed to an engine intake manifold 216, and the output of the engine intake manifold 216 is divided between cylinders 242 of an engine 240. The illustration of FIG. 2 shows an engine 240 with six cylinders 242. Various parameters, for example, pressure, temperature and diluent mass fraction at the intake manifold 216 can be monitored.

The exhaust gasses of the cylinders 242 of the engine 240 are fed to an engine exhaust manifold 218. The exhaust gasses from the exhaust manifold 218 are either recirculated through the EGR cooler 212 or expelled from the system. Various parameters, for example, pressure, temperature and diluent mass fraction at the exhaust manifold 218 can be monitored.

The output from the EGR cooler 212 passes through an EGR valve 214 and into the mixer 210. Various parameters, for example, pressure, temperature and diluent mass fraction in the EGR cooler 212 can be monitored. Sensors can be positioned between the EGR cooler 212 and the EGR valve 214 to monitor the EGR cooler outlet temperature and pressure as well as other parameters. A position sensor can be used to monitor the position of the EGR valve 214. An EGR flow Venturi can be located between the EGR valve 214 and the mixer 210.

The exhaust gasses expelled from the exhaust manifold 218 pass through a high pressure turbine 224 and a low pressure turbine 222. The high pressure turbine 224 can be a variable geometry turbocharger (VGT) with a vane position sensor to monitor the vane positions. Various other parameters, for example, pressure, temperature, turbocharger speed can be monitored. An exhaust back pressure at the output of the low pressure turbine 222 can also be monitored.

The system shown in FIG. 2 can be modeled by state equations that are based on the conservation of mass, energy, and momentum. Some relationships can be approximated using first order filters. Each state equation describes a rate of change. The state value at any given time can be determined by integration of the state equation. Within the ECU, each state can be given an initial condition and the state value at each time step of the controller can be updated using numeric integration.

The rate of change of mass in the charge air cooler (CAC) 206 can be modeled by the difference between the rate of change of mass coming in from the compressors 202, 204 and the rate of change of mass going out to the air throttle 208 as:

$$\frac{dm_{cac}}{dt} = \dot{m}_{cmp} - \dot{m}_{at} \qquad (1)$$

The rate of change of mass in the intake manifold 216 can be modeled by the sum of the rate of change of mass coming in from the air throttle 208 and the EGR valve 214 minus the rate of change of mass going into the engine 240 as:

$$\frac{dm_{im}}{dt} = \dot{m}_{at} + \dot{m}_{egr} - \dot{m}_{eng\_in} \qquad (2)$$

The rate of change of diluent mass in the intake manifold 216 can be modeled as the sum of the rate of change in mass coming from the air throttle 208 times the mass fraction of diluent in the charge air cooler 206 (can assume same as the mass fraction of water in ambient air due to humidity) plus the rate of change of mass coming in from the EGR valve 214 times the mass fraction of diluent in the exhaust manifold 218, minus the rate of change of mass going into the engine 240 times the mass fraction of diluent in the intake manifold 216 as:

$$\frac{dm_{d\_im}}{dt} = \dot{m}_{at} \cdot X_{d\_cac} + \dot{m}_{egr} \cdot X_{d\_em} - \dot{m}_{eng\_in} \cdot X_{d\_im} \qquad (3)$$

The term diluent is used to describe everything other than dry air (or fuel) that is included in a mixture.

The rate of change of mass in the exhaust manifold 218 can be modeled by the rate of change of mass coming out of the engine 240 minus the rate of change of mass going into the EGR cooler 212 and the rate of change of mass going into the turbines 222, 224 as:

$$\frac{dm_{em}}{dt} = \dot{m}_{eng\_out} - \dot{m}_{egr} - \dot{m}_{trb} \qquad (4)$$

The rate of change of diluent mass in the exhaust manifold 218 can be modeled by the difference between the rate of change of mass coming in from the engine 240 times the mass fraction of diluent coming in from the engine 240 and the sum of the rates of change of mass going into the EGR cooler 212 and the turbines 222, 224 times the mass fraction of diluent in the exhaust manifold 218 as:

$$\frac{dm_{d\_em}}{dt} = \dot{m}_{eng\_out} \cdot X_{d\_eng\_out} - (\dot{m}_{egr} + \dot{m}_{trb}) \cdot X_{d\_em} \qquad (5)$$

The rate of change of temperature at the output of the CAC 206 can be modeled by the difference between the steady state temperature at the output of the CAC 206 and the measured temperature at the output of the CAC 206 divided by a time constant for the CAC 206 as:

$$\frac{dt_{caco}}{dt} = \frac{(T_{caco\_ss} - T_{caco})}{\tau_{cac}} \qquad (6)$$

The rate of change of temperature at the output of the EGR cooler 212 can be modeled by the difference between the steady state temperature at the output of the EGR cooler 212 and the measured temperature at the output of the EGR cooler 212 divided by a time constant for the EGR cooler 212 as:

$$\frac{dt_{egrco}}{dt} = \frac{(T_{egrco\_ss} - T_{egrco})}{\tau_{egrc}} \qquad (7)$$

The steady state cooler outlet temperatures $T_{caco\_ss}$ and $T_{egrco\_ss}$ can be calculated using a heat exchanger effectiveness model. The effectiveness can be calibrated using a table with mass flow as the input. An effectiveness of one means the cooler outlet temperature is equal to the temperature of the cooling fluid, and an effectiveness of zero means there is no change in temperature between the cooler inlet and outlet.

The rate of temperature change of the intake manifold 216 can be calculated using the mass flows in and out, the temperature in and out, and the change in mass within the intake manifold 216. The rate of change of temperature of the intake manifold 216 can be modeled by the rate of change of mass at the air throttle 208 times $C_P$ times the temperature at the output of the CAC 206 plus the rate of change of mass at the EGR valve 214 times $C_P$ times the temperature at the output of the EGR cooler 212 minus the rate of change of mass going into the engine 240 times $C_P$ times the temperature of the intake manifold 216 minus the rate of change of mass in the intake manifold 216 times $C_V$ times the temperature of the intake manifold 216, all divided by the product of the mass at the intake manifold 216 times $C_V$ as:

$$\frac{dT_{im}}{dt} = \frac{\dot{m}_{at} \cdot C_p \cdot T_{caco} + \dot{m}_{egr} \cdot C_p \cdot T_{egrco} - \dot{m}_{eng\_in} \cdot C_p \cdot T_{im} - \frac{dm_{im}}{dt} \cdot C_v \cdot T_{im}}{m_{im} \cdot C_v} \qquad (8)$$

where $C_P$ is the specific heat at constant volume, and $C_V$ is the specific heat at constant pressure. The specific heat can be measured experimentally at constant volume or constant pressure. $C_P$ is greater than $C_V$ because as the mixture is heated at constant pressure it expands doing work on the container or the fluid around it. $C_P$ can be used to calculate energy flow into or out of the control volume. $C_V$ can be used to calculate the change in energy within the control volume due to changes in temperate and mass.

The rate of change of temperature at the exhaust manifold 218 can be modeled by the difference between the temperature at the output of the engine 240 and the temperature of the exhaust manifold 218 divided by a time constant for the exhaust manifold 218 as:

$$\frac{dT_{em}}{dt} = \frac{(T_{eng\_out} - T_{em})}{\tau_{em}} \quad (9)$$

The rate of change in low pressure turbocharger speed can be modeled by the sum of the torques on the low pressure turbocharger shaft and blades divided by the inertia of the low pressure turbocharger shaft and blades (Newton's second law for rotation). The sum of the torques can be modeled by the difference between low pressure turbine power and low pressure compressor power divided by the low pressure turbocharger speed. The turbine power (or compressor power) can be calculated from the change in enthalpy of the gas as it goes through the turbine (or compressor). The enthalpy change is equal to the mass flow rate times the specific heat at constant pressure ($C_p$) times the delta temperature across the turbine (or compressor). When turbocharger speed is expressed in units of revolutions per minute (rpm), it must be converted to radians per second (rad/s) using a factor of $\pi/30$. The inverse of this factor is squared in equation (10) to convert $N_{lpt}$ in the denominator and also to express the solution $dN_{lpt}/dt$ in units of revolutions per minute per second (rpm/s).

$$\frac{dN_{lpt}}{dt} = \frac{1}{J_{lpt}} \cdot \left(\frac{\dot{W}_{lp\_trb} - \dot{W}_{lp\_cmp}}{N_{lpt}}\right) \cdot \left(\frac{30/\pi \; rpm}{rad/s}\right)^2 \quad (10)$$

The rate of change in high pressure turbocharger speed can be modeled by the sum of the torques on the high pressure turbocharger shaft and blades divided by the inertia of the high pressure turbocharger shaft and blades (Newton's second law for rotation). The sum of the torques can be modeled by the difference between high pressure turbine power and high pressure compressor power divided by the high pressure turbocharger speed. The turbine power (or compressor power) can be calculated from the change in enthalpy of the gas as it goes through the turbine (or compressor). The enthalpy change is equal to the mass flow rate times the specific heat at constant pressure ($C_p$) times the delta temperature across the turbine (or compressor). When turbocharger speed is expressed in units or revolutions per minute (rpm) it must be converted to radians per second (rad/s) using a factor of $\pi/30$. The inverse of this factor is squared in equation (11) to convert $N_{hpt}$ in the denominator and also to express the solution $dN_{hpt}/dt$ in units of revolutions per minute per second (rpm/s).

$$\frac{dN_{hpt}}{dt} = \frac{1}{J_{hpt}} \cdot \left(\frac{\dot{W}_{hp\_trb} - \dot{W}_{hp\_cmp}}{N_{hpt}}\right) \cdot \left(\frac{30/\pi \; rpm}{rad/s}\right)^2 \quad (11)$$

The air throttle and EGR valve can be modeled using the compressible gas flow equation for an orifice as:

$$\dot{m}_{at} = C_{d\_at}(u_{at}) \cdot A_{at} \cdot \frac{P_{caco}}{\sqrt{R \cdot T_{caco}}} \cdot \Psi\left(\frac{P_{im}}{P_{caco}}\right), \text{ and} \quad (12)$$

$$\dot{m}_{egr} = C_{d\_egr}(u_{egr}) \cdot A_{egr} \cdot \frac{P_{egrco}}{\sqrt{R \cdot T_{egrco}}} \cdot \Psi\left(\frac{P_{im}}{P_{egrco}}\right) \quad (13)$$

where $C_{d\_at}$ and $C_{d\_egr}$ are the discharge coefficients for the air throttle 208 and the EGR valve 214, respectively, which can be calibrated using a table with actuator position ($u_{at}$ and $u_{egr}$, respectively) as the input. The fresh air flow correction factor $CF_{air}$ (calculated below in equation (26)) and the EGR correction factor $CF_{egr}$ (calculated below in equation (32)) can be used to multiply the result of the air throttle and EGR valve mass flow equations (12) and (13), respectively, as:

$$\dot{m}_{at} = CF_{air} \cdot C_{d\_at}(u_{at}) \cdot A_{at} \cdot \frac{P_{caco}}{\sqrt{R \cdot T_{caco}}} \cdot \Psi\left(\frac{P_{im}}{P_{caco}}\right), \text{ and} \quad (12A)$$

$$\dot{m}_{egr} = CF_{egr} \cdot C_{d\_egr}(u_{egr}) \cdot A_{egr} \cdot \frac{P_{egrco}}{\sqrt{R \cdot T_{egrco}}} \cdot \Psi\left(\frac{P_{im}}{P_{egrco}}\right) \quad (13A)$$

The areas A can be calculated using the actuator bore diameters. The term R is the gas constant. The compressible gas flow factor is a function of pressure ratio and can be calibrated using a table with pressure ratio as the input. The table values can be calculated off-line using the following equations:

$$\Psi\left(\frac{P_{out}}{P_{in}}\right) = \left(\frac{P_{out}}{P_{in}}\right)^{\frac{1}{k}} \cdot \sqrt{\frac{\frac{2 \cdot k}{k+1}}{\left(1 - \left(\frac{P_{out}}{P_{in}}\right)^{\frac{k-1}{k}}\right)}} \quad \text{for } \left(\frac{P_{out}}{P_{in}}\right) \geq \left(\frac{2 \cdot k}{k+1}\right)^{\frac{k}{k-1}} \quad (14)$$

$$\Psi\left(\frac{P_{out}}{P_{in}}\right) = \sqrt{k \cdot \left(\frac{2}{k+1}\right)^{\frac{k+1}{k-1}}} \quad \text{for } \left(\frac{P_{out}}{P_{in}}\right) < \left(\frac{2 \cdot k}{k+1}\right)^{\frac{k}{k-1}} \quad (15)$$

where the term k represents the ratio of specific heats $C_p/C_v$.

The mass flow calculation for the charge air cooler 206 and the EGR cooler 212 can be based on the Darcy-Weisbach equation:

$$h_f = f \cdot \frac{L}{d} \cdot \frac{V^2}{2 \cdot g} \quad (16)$$

This relationship was developed for a pipe, but the structure of the coolers 206, 212 are similar. The term $h_f$ is the pipe head loss, f is the Darcy friction factor, L is the pipe length, d is the diameter, V is velocity, and g is the gravitational constant.

Pressure drop is related to the head loss by:

$$\Delta P = \rho \cdot g \cdot h_f \quad (17)$$

Substituting (16) into (17) results in:

$$\Delta P = f \cdot \frac{L}{d} \cdot \frac{\rho \cdot V^2}{2} \quad (18)$$

Velocity and mass flow are related by:

$$V = \frac{\dot{m}}{\rho \cdot A} \quad (19)$$

Substituting (19) into (18) results in:

$$\Delta P = f \cdot \frac{L}{d} \cdot \frac{1}{2 \cdot A^2} \cdot \frac{\dot{m}^2}{\rho} \quad (20)$$

Equation (20) shows a relationship between mass flow squared over density and the pressure drop across the cooler. The remaining terms are constant. An empirical model of this form can be fit to experimental data. The experimental data may also show a relationship to temperature change across the cooler. This finding is reasonable because the density is changing as the gasses flow through the cooler and not constant as indicated by equation (20). These relationships can be calibrated using a regression model or tables of the following form, where delta pressure and delta temperature are the inputs:

$$\frac{\dot{m}_{cac}^2}{\rho_{cac\_avg}} = CACMassFlowSquaredOverDensityTable(\Delta P_{cac}, \Delta T_{cac}) \quad (21)$$

$$\frac{\dot{m}_{egrc}^2}{\rho_{egrc\_avg}} = \quad (22)$$

$$EGRCMassFlowSquaredOverDensityTable(\Delta P_{egrc}, \Delta T_{egrc})$$

The inlet and outlet temperatures of each cooler 206, 212 can be modeled and/or the temperatures can be measured. Half of the cooler can be assumed to be at the inlet temperature and half of the cooler can be assumed to be at the outlet temperature. The average cooler density can be calculated using the average temperature and average pressure. Assuming a linear drop in pressure and temperate across the cooler, the average temperature and average pressure can be calculated by averaging inlet and outlet values. The mass flow can be calculated by multiplying the average density by the table output and then taking the square root. The fresh air flow correction factor $CF_{air}$ (calculated below in equation (26)) and the EGR correction factor $CF_{egr}$ (calculated below in equation (32)) can be included in these mass flow calculations for the coolers as:

$$\dot{m}_{cac} = CF_{air}\sqrt{\rho_{cac\_avg} \cdot CACFlowSqOverDensityTbl(\Delta P_{cac}, \Delta T_{cac})} \quad (21A)$$

$$\dot{m}_{egrc} = \quad (22A)$$
$$CF_{air}\sqrt{\rho_{egrc\_avg} \cdot EGRCFlowSqOverDensityTbl(\Delta P_{egrc}, \Delta T_{egrc})}$$

The mass flow through the charge air cooler 206 and the air throttle 208 can be assumed to be the same. The outlet pressure of the charge air cooler 206 can be estimated using a binary search algorithm that searches for a charge air cooler outlet pressure that results in the mass flow of the charge air cooler 206 and the mass flow of the air throttle 208 being the same. The outlet pressure of the charge air cooler 206 should be between the inlet pressure of the charge air cooler 206 and the pressure of the intake manifold 216.

This entire range does not have to be searched at every ECU time step. To reduce processor load, the previous solution can be used as a starting point and only a small range searched around that value. Even though the solution may not be within the search range under extreme transient conditions, the solution should converge within a few ECU time steps.

The calculation can begin by evaluating mass flow through the charge air cooler 206 and the air throttle 208 with the previous outlet pressure of the charge air cooler 206. If the mass flow of the air throttle 208 is lower than the mass flow of the charge air cooler 206, then the outlet pressure of the charge air cooler 206 can be adjusted up by a percentage of the maximum search range (charge air cooler inlet pressure−intake manifold pressure). Otherwise, the outlet pressure of the charge air cooler 206 can be adjusted down by a percentage of the maximum search range. This process can be repeated with percentage adjustments of, for example, 4, 2, 1, 0.5 and 0.25 percent of the maximum search range (charge air cooler inlet pressure−intake manifold pressure).

The same type of iterative solution technique can be used for the mass flow through the EGR cooler 212 and the EGR valve 214.

The compressors 202, 204 and turbines 222, 224 can be modeled using mass flow tables and efficiency tables (turbocharger maps). The pressure ratio across the compressors (or turbines) and the turbocharger speed can be used to determine the mass flow and efficiency. These calculations can include corrections for temperature and pressure when not operating at the standard conditions for the turbocharger maps. The efficiency can be used to calculate the outlet temperature and the turbocharger shaft power. The turbocharger speed can be calculated using the compressor power, turbine power, and inertia as shown by equations (10) and (11).

A variable geometry turbocharger (VGT) 224 has adjustable vanes on the turbine that change the turbine performance characteristics. Moving the vanes in the closing direction causes the pressure of the exhaust manifold 218 to increase. Up to some point this also causes the turbine power to increase, which causes the turbocharger to speed up and provide more compressor flow. If the turbine vanes are closed too much the turbine flow can be "choked" and the power may drop.

To model the turbine operation at various vane positions, multiple turbine tables can be used that characterize the turbine performance at different vane positions. For operation at vane positions between the tables, interpolation can be used to determine the mass flow and efficiency.

Two stage turbochargers have two compressors in series and two turbines in series, as shown in FIG. 2. The interstage volume between the compressors 202, 204 and between the turbines 222, 224 is small, making it difficult to dynamically model the pressure. A small change in flow causes a large change in pressure. At the time steps used in the ECU, the modeled interstage pressure can become numerically unstable. A flow change over one time step can cause a change in pressure that in turn causes another change in flow and pressure causing the modelled pressures and flows to oscillate. This can be overcome by using a very small time step but that is not typically practical for calculations within an ECU.

To eliminate the numeric instability, the flow through each compressor 202, 204 can be assumed to be the same. Likewise, the flow through each turbine 222, 224 can be assumed to be the same. The interstage pressure can then be solved iteratively using a binary search algorithm that adjusts the interstage pressure until the flow through each compressor (or turbine) is the same. This is similar to the search algorithm described above for the charge air cooler 206 and the air throttle 208.

The observer controller can make corrections to the air system model so that the estimated states match the measured states. The modeled states may have error due to modeling errors, engine variation, changing engine characteristics over time, air leaks and other sources. Three examples of model corrections are: fresh air mass flow correction term, EGR mass flow correction term, and turbine mass flow correction term. These correction terms can be calculated within the observer controller based on: intake manifold pressure error, EGR mass flow error, and exhaust manifold pressure error, respectively. The model corrections can be multiplicative correction factors, additive or offset correction factors or other types of correction terms. Exemplary correction term calculations are shown below. The correction terms can be applied to the observer model as well as to the models used in actuator control calculations.

A fresh air flow correction factor $CF_{air}$ can be applied as a correction to the compressor mass flow estimates, charge air cooler mass flow estimates, and air throttle mass flow estimates. The pressure error at the intake manifold 216 is the difference between the modelled and measured pressures:

$$P_{im\_obs\_error} = P_{im\_sensor} - P_{im} \quad (23)$$

A proportional air flow correction factor $CF_{air\_prop}$ can be calculated as a constant times the pressure error at the intake manifold 216:

$$CF_{air\_prop} = K_{p\_im\_obs} \cdot P_{im\_obs\_error} \quad (24)$$

An incremental air flow intake correction factor $CF_{air\_int}$ can also be calculated based on the pressure error at the intake manifold 216 as:

$$CF_{air\_int} = K_{i\_im\_obs} \cdot P_{im\_obs\_error} + CF_{air\_int\_previous} \quad (25)$$

A fresh air flow correction factor $CF_{air}$ can be estimated by the sum of these air flow correction factors:

$$CF_{air} = CF_{air\_prop} + CF_{air\_int} \quad (26)$$

A turbine mass flow correction factor $CF_{trb}$ can be applied as a correction to the turbine mass flow estimates. The pressure error at the exhaust manifold 218 is the difference between the modelled and measured pressures:

$$P_{em\_obs\_error} = P_{em\_sensor} - P_{em} \quad (27)$$

A proportional turbine correction factor $CF_{trb\_prop}$ can be calculated as a constant times the pressure error at the exhaust manifold 218:

$$CF_{trb\_prop} = -K_{p\_em\_obs} \cdot P_{em\_obs\_error} \quad (28)$$

An incremental turbine intake correction factor $CF_{trb\_int}$ can also be calculated based on the pressure error at the exhaust manifold 218 as:

$$CF_{trb\_int} = -K_{i\_em\_obs} \cdot P_{em\_obs\_error} + CF_{trb\_int\_previous} \quad (29)$$

A turbine intake correction factor $CF_{trb}$ can be estimated by the sum of these turbine correction factors:

$$CF_{trb} = CF_{trb\_prop} + CF_{trb\_int} \quad (30)$$

An EGR mass flow correction factor $CF_{egr}$ can be applied as a correction to the EGR cooler mass flow estimates, and the EGR valve mass flow estimates. A mass flow sensor can be located between the EGR valve 214 and the mixer 210, and the mass flow error at the EGR cooler 212 can be estimated as the difference between the modelled and measured mass flows:

$$\dot{m}_{egr\_obs\_error} = \dot{m}_{egr\_sensor} - \dot{m}_{egr} \quad (31)$$

An EGR Flow Venturi can be located between the EGR valve 214 and the mixer 210 to measure the EGR mass flow. The pressure drop from the inlet to the throat of the Venturi (delta pressure) is related to the mass flow rate. Some engines can use an EGR flow orifice, and the measured pressure ratio across the orifice can be related to the flow rate (e.g., using equation 13). An incremental EGR correction factor $CF_{egr}$ can be calculated based on this mass flow error as:

$$CF_{egr} = K_{i\_egr\_obs} \cdot \dot{m}_{egr\_obs\_error} + CF_{egr\_previous} \quad (32)$$

Proportional plus integral (PI) controllers can be used for the intake manifold pressure and exhaust manifold pressure control. An integral controller can be used for the EGR mass flow error control. The EGR mass flow correction factor can be applied directly to the EGR mass flow estimate to make integral control sufficient.

Fuel reacts with oxygen during combustion. When fuel reacts with a quantity of air that has just enough oxygen to combine with all the fuel molecules to form combustion products of carbon dioxide and water, that ratio of fuel to air is called the stoichiometric ratio. Diesel engines typically run leaner than the stoichiometric ratio meaning they have excess air in the cylinder. This excess air passes through the exhaust valves into the exhaust with the burnt gasses.

Engines do not typically run on only dry air. The air that enters the engine may have some water vapor. In addition, modern engines commonly use exhaust gas recirculation (EGR) to reduce combustion temperatures for controlling nitrogen oxides (NOx) emissions. Recirculated exhaust gas may contain combustion products as well as air.

The term "diluent" is used to describe everything other than dry air (or fuel) that is included in a mixture. The mass fraction of oxygen in dry air is 0.232. If the oxygen mass fraction in a mixture is known, the air mass fraction can be determined by dividing by 0.232. If there is no fuel, the diluent mass fraction can be calculated by taking one minus the air mass fraction.

Within an air system state observer, the diluent mass fraction can be calculated for the charge air cooler, intake manifold, and exhaust manifold. The diluent mass fraction can be chosen as a variable for convenience because it increases with increasing EGR for the intake and exhaust manifolds. For the charge air cooler, the diluent mass fraction increases with increasing ambient relative humidity. The same modeling results can be obtained using dry air mass fraction or oxygen mass fraction as state variables.

Another way to describe the diluent concentration is as a ratio of diluent to air (D/A). D/A can be used as a variable for the in-cylinder concentration to be consistent with fuel-to-air ratio (F/A), which is commonly used for engine control.

Two important parameters in air system control are the in-cylinder diluent-to-air ratio (D/A) and fuel-to-air ratio (F/A). D/A is controlled to regulate NOx. F/A is controlled to prevent rich operation causing smoke, and to prevent lean operation causing high cylinder pressure. These ratios can be calculated from the desired fuel per cylinder, the air mass in-cylinder when the intake valve closes, and the diluent mass in-cylinder when the intake valve closes. The in-cylinder air mass has two components: air that is present in the residual mass from the previous engine cycle, and air that entered through the intake valve on the current engine cycle:

$$m_{a\_cyl} = m_{a\_cyl\_in} + m_{a\_res} \quad (33)$$

Likewise the in-cylinder diluent mass has two components: diluent that is present in the residual mass from the previous engine cycle, and diluent that entered through the intake valve on the current engine cycle.

$$m_{d\_cyl} = m_{d\_cyl\_in} + m_{d\_res} \quad (34)$$

The in-cylinder fuel-to-air ratio (F/A) is then:

$$F/A = \frac{m_{f\_des}}{m_{a\_cyl}} \quad (35)$$

and the in-cylinder diluent-to-air ratio (D/A) is:

$$D/A = \frac{m_{d\_cyl}}{m_{a\_cyl}} \quad (36)$$

A model can be used to predict the residual air mass and residual diluent mass. The speed density mass flow model and the intake manifold diluent mass fraction can be used to estimate the air mass and diluent mass that enters through the valves.

Figure 3:
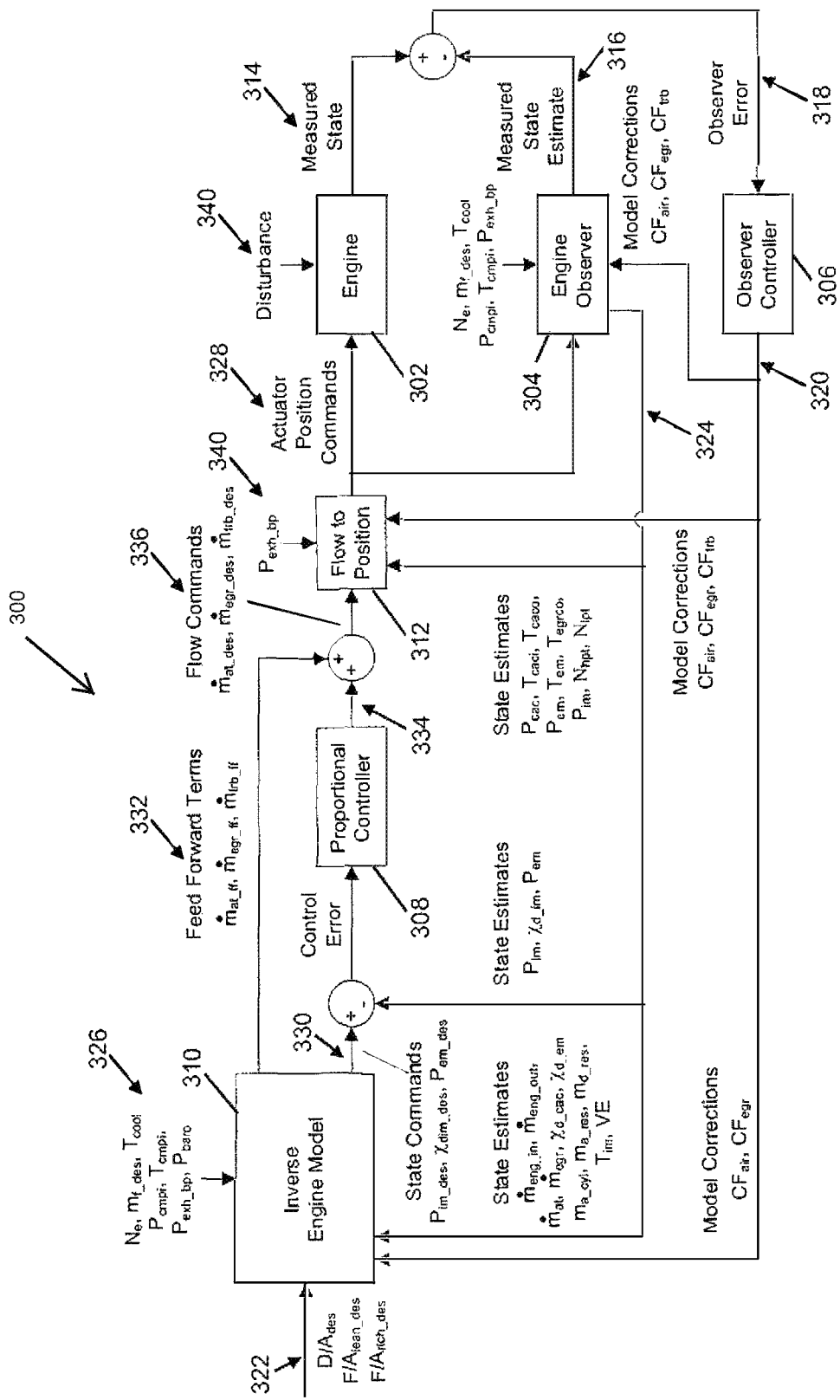
FIG. 3 illustrates a high level view of an exemplary control method.

FIG. 3 illustrates a high level view of an exemplary control system 300. In this exemplary system, information is used to convert the desired in-cylinder states to manifold states, the desired flow rates to achieve those states are then calculated, and then the flow models and model corrections are used to calculate the actuator positions. The control system 300 includes an engine 302, an engine observer model 304, an observer controller 306, a proportional feedback controller 308, a feed forward or inverse engine model 310 and a flow-to-position module 312.

The physical engine 302 experiences disturbances 340 that are not modeled by the observer model 304. Sensors monitoring the engine 302 provide a measured state 314. The engine observer model 304 processes various inputs (including, for example, speeds, masses, pressures, temperatures, model corrections, etc.) and generates a measured state estimate 316 to be compared with the measured state 314, as well as controlled state estimates 324 that are provided to the inverse engine model 310 and the flow-to-position module 312. The difference between the measured state 314 and the measured state estimate 316 provides an observer error 318 that is input to the observer controller 306.

The observer controller 306 generates model corrections 320 that are provided to the engine observer model 304, the inverse engine model 310 and the flow-to-position module 312. The model corrections generated by the observer controller 306 can include an integral term that drives the steady state error to zero. This can help keep operation of the engine observer model 304 close to that of the real engine 302. Another option would be to only use proportional control in the observer controller 306 and have a proportional plus integral (PI) controller for the main feedback control 308.

The inverse engine model or feed forward controller 310 takes the controlled state estimates 324 generated by the engine observer model 304, the model corrections 320 generated by the observer controller 306, desired state inputs 322 and various system parameters 326 and calculates desired engine state commands 330 and feed forward mass flow terms 332 to achieve the desired D/A and F/A values included in the desired state inputs 322.

The difference between the controlled state estimates 324 generated by the engine observer model 304 and the desired engine state commands 330 generated by the inverse engine model 310 is input to the feedback controller 308 which calculates proportional flow commands 334. The proportional feedback controller 308 can be used for transient control. To change a manifold pressure more or less mass has to be stored in the manifold. This change in mass storage can be achieved using the proportional controller 308. Using the proportional controller 308 can provide smoother operation than using a derivative term in the feed forward calculation. The proportional feedback controller 308 also can remove error that may not be covered by the model correction factors because of the response time or limits that may be applied to the correction factors.

The sum of the feed forward mass flows 332 generated by the inverse engine model 310 and the proportional flow commands 334 generated by the proportional feedback controller 308 provides flow commands 336 that are input to the flow-to-position module 312. The flow-to-position module 312 also receives inputs of the model corrections 320 generated by the observer controller 306 and the controlled state estimates 324 generated by the engine observer model 304. The flow-to-position module 312 takes these inputs and an exhaust back pressure and calculates actuator position commands 328 that are input to the engine 302 and the engine observer model 304.

Figure 4:
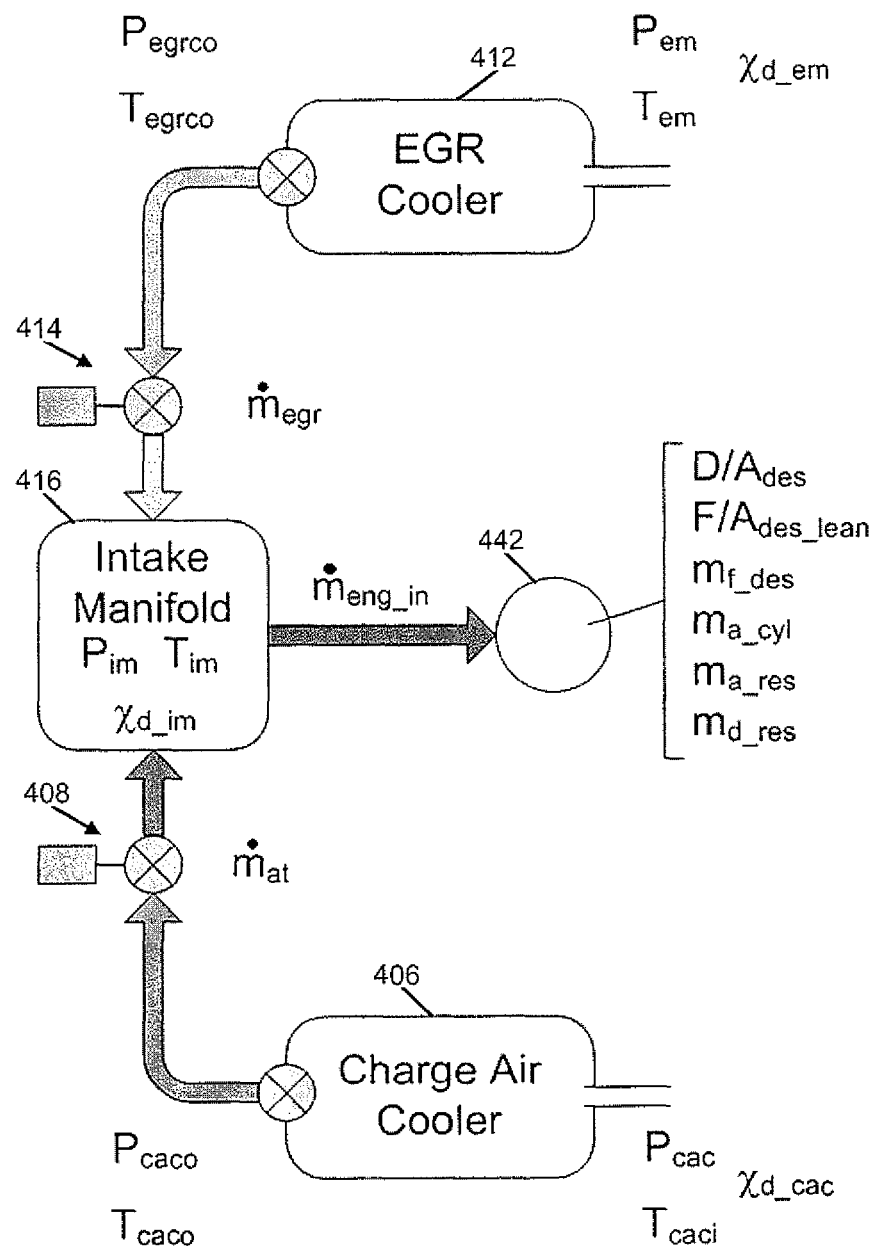
FIG. 4 illustrates an exemplary air throttle and EGR valve control system.

FIG. 4 illustrates an exemplary air throttle and EGR valve control system 400 which includes a charge aft cooler (CAC) 406, an air throttle 408, an intake manifold 416, an EGR valve 414, an EGR cooler 412 and a cylinder 442. Only one cylinder 442 is shown for clarity but the engine would include multiple cylinders 442 and the output from the intake manifold 416 would be distributed across the multiple cylinders 442.

The air throttle 408 and EGR valve 414 provide fast response for controlling the diluent mass fraction and pressure of the intake manifold 416. The turbocharge vanes (see VGT 224 of FIG. 2) can also be adjusted to control the EGR flow and fresh air flow but this control is slower. Control of the turbocharger is typically for providing sufficient exhaust manifold pressure and charge air cooler pressure so that the air throttle 408 and EGR valve 414 can be adjusted to achieve the desired setpoints.

The system can be designed to give the diluent-to-air-ratio (D/A) control higher priority than the fuel-to-air-ratio (F/A) control. D/A is controlled by regulating the diluent mass fraction of the intake manifold 416. F/A is controlled by regulating the pressure of the intake manifold 416. In general, D/A control is faster than F/A control.

Figure 5:
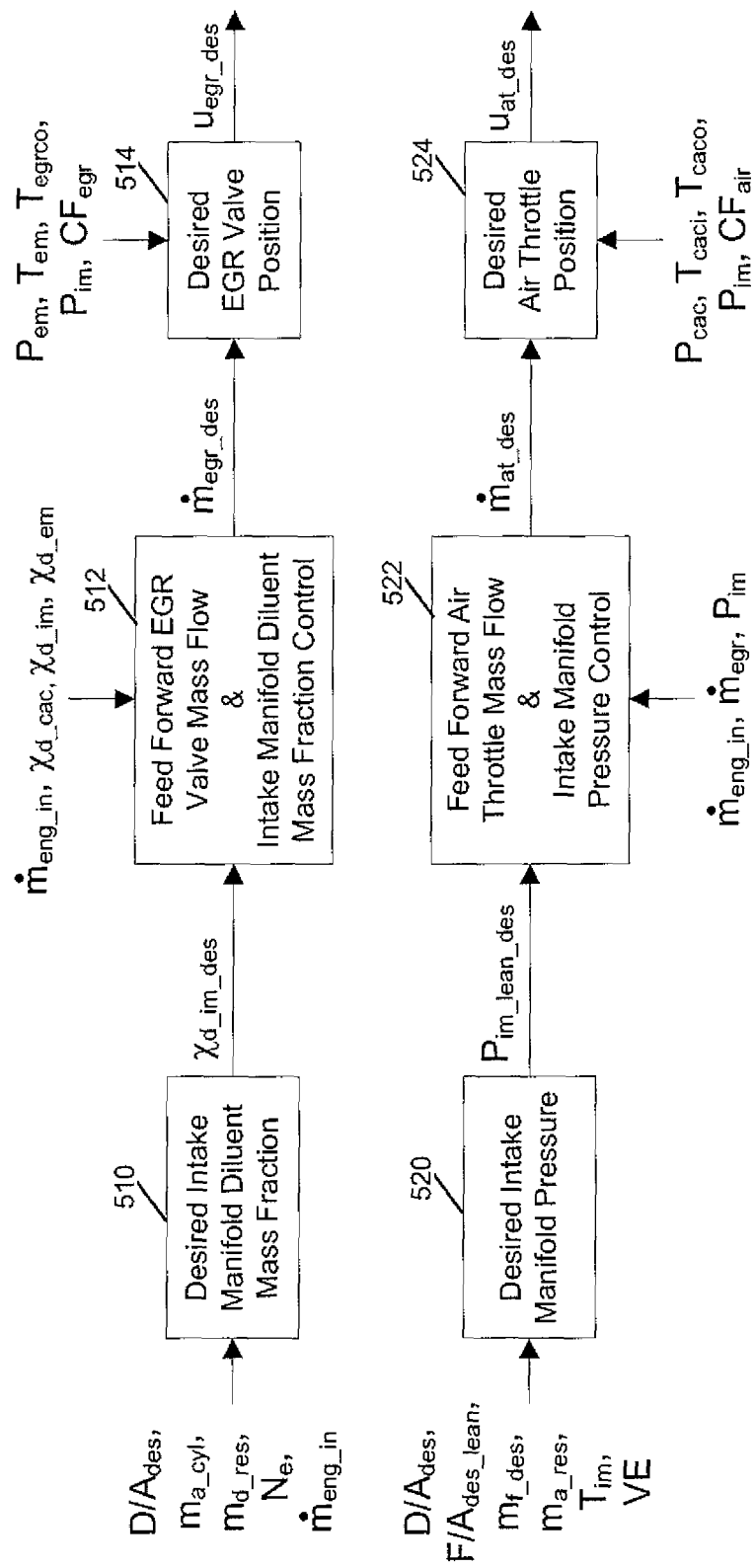
FIG. 5 illustrates an exemplary method for calculating desired EGR valve and air throttle positions.

The desired diluent concentration in the intake manifold 416 can be calculated using the current in cylinder air mass instead of a desired value calculated from the F/A setpoint because under transient conditions it may take a long time to achieve the F/A setpoint. FIG. 5 shows a block diagram for the control.

The desired diluent mass fraction of the intake manifold 416 can be calculated at block 510 using the following exemplary method. The EGR control calculation can calculate the mass of diluent that is desired in-cylinder using the estimated current air mass in-cylinder and the desired D/A setpoint:

$$m_{d\_cyl\_des} = m_{a\_cyl} * D/A_{des} \quad (37)$$

The mass of diluent to enter the cylinder can then be calculated by subtracting the residual diluent mass from the desired in-cylinder diluent mass:

$$m_{d\_cyl\_in\_des} = m_{d\_cyl\_des} - m_{d\_res} \quad (38)$$

The desired diluent mass flow into the engine can then be calculated using engine speed and the number of cylinders:

$$\dot{m}_{d\_eng\_in\_des} = m_{d\_cyl\_in\_des} \cdot n_{cyl} \cdot N_e(\text{rpm}) \cdot \left(\frac{\min}{60 \sec}\right) \cdot \left(\frac{\text{cycle}}{2 \text{ rev}}\right) \quad (39)$$

The desired intake manifold diluent mass fraction can then be calculated by dividing the desired engine-in diluent mass flow by the speed density mass flow:

$$X_{d\_im\_des} = \frac{\dot{m}_{d\_eng\_in\_des}}{\dot{m}_{eng\_in}} \quad (40)$$

The desired mass flow through the EGR valve 414 can be calculated at block 512 using the following exemplary method. The following equation can be used to relate the desired diluent mass fraction of the intake manifold 416 to the feed forward intake manifold EGR mass fraction:

$$X_{d\_im\_des} = X_{d\_em} \cdot X_{egr\_im\_ff} + X_{d\_cac} \cdot (1 - X_{egr\_im\_ff}) \quad (41)$$

The mass fraction of diluent in the charge air cooler 406 can be used in this calculation to account for water vapor that may enter with the fresh air. Water vapor is considered a diluent. This equation can be re-arranged to solve for the feed forward intake manifold EGR mass fraction as:

$$X_{egr\_im\_ff} = \frac{X_{d\_im\_des} - X_{d\_cac}}{X_{d\_em} - X_{d\_cac}} \quad (42)$$

The feed forward EGR mass flow can be calculated by multiplying the feed forward intake manifold EGR mass fraction by the engine in mass flow estimate:

$$\dot{m}_{egr\_ff} = X_{egr\_im\_ff} \cdot \dot{m}_{eng\_in} \quad (43)$$

The intake manifold diluent mass fraction error is the difference between the desired intake manifold diluent mass fraction and the intake manifold diluent mass fraction estimate:

$$X_{d\_im\_error} = X_{d\_im\_des} - X_{d\_im} \quad (44)$$

The error can be multiplied by the proportional gain to determine the closed loop term by:

$$\dot{m}_{egr\_cl} = K_{p\_egr} \cdot X_{d\_im\_error} \quad (45)$$

$K_{p\_egr}$ can be calibrated using a table with exhaust manifold diluent mass fraction as the input. This allows higher gains to be used when the exhaust manifold diluent mass fraction is low. The desired mass flow through the EGR valve 414 is the sum of the feed forward term and the closed loop term:

$$\dot{m}_{egr\_des} = \dot{m}_{egr\_ff} + \dot{m}_{egr\_cl} \quad (46)$$

The calculation of the desired position of the EGR valve 414 at block 514 will be described below along with the calculation of the desired position of the air throttle 408 at block 524.

The air throttle feed forward command can be calculated using the engine in mass flow estimate and the EGR valve mass flow estimate as:

$$\dot{m}_{at\_ff} = \dot{m}_{eng\_in} - \dot{m}_{egr} \quad (47)$$

This air throttle feed forward term can be used to achieve a flow that will keep the pressure of the intake manifold 416 constant. The closed loop term that will be calculated next is used to change the pressure of the intake manifold 416.

The desired air mass in-cylinder can be calculated using the desired fuel command and the desired F/A lean setpoint as:

$$m_{a\_cyl\_lean\_des} = \frac{m_{f\_des}}{F/A_{lean\_des}} \quad (48)$$

A lean setpoint can be used here because the air throttle command is only used to close the air throttle 408 when the engine operation becomes too lean. The turbocharger can use a F/A rich setpoint to increase the engine boost when the engine operation becomes too rich. Having this control deadband between the rich and lean setpoints can allow the air throttle and turbocharger vanes to remain more open more of the time than they would be if controlling to one F/A setpoint.

The desired pressure of the intake manifold 416 can be calculated at block 520 using the following exemplary method. The desired diluent mass in-cylinder can be calculated using the desired in-cylinder lean air mass and the desired D/A setpoint as:

$$m_{d\_cyl\_lean\_des} = m_{a\_cyl\_lean\_des} \cdot D/A_{des} \quad (49)$$

The mass of air to enter the cylinder can then be calculated by subtracting the residual air mass from the desired in-cylinder air mass:

$$m_{a\_cyl\_in\_lean\_des} = m_{a\_cyl\_lean\_des} - m_{a\_res} \quad (50)$$

The mass of diluent to enter the cylinder can be calculated by subtracting the residual diluent mass from the desired in-cylinder diluent mass:

$$m_{d\_cyl\_in\_lean\_des} = m_{d\_cyl\_lean\_des} - m_{d\_res} \quad (51)$$

The total mass to enter the cylinder can be calculated as the sum of the air mass to enter the cylinder and the diluent mass to enter the cylinder:

$$m_{cyl\_in\_lean\_des} = m_{a\_cyl\_in\_lean\_des} + m_{d\_cyl\_in\_lean\_des} \quad (52)$$

The pressure needed to achieve this mass can be found using the ideal gas law and the volumetric efficiency by:

$$P_{im\_lean\_des} = \frac{n_{cyl} \cdot m_{cyl\_in\_lean\_des} \cdot R \cdot T_{im}}{V_d \cdot VE} \quad (53)$$

This equation is related to the speed-density calculation but does not account for speed because mass per cylinder is used instead of a mass flow. The desired intake manifold lean pressure may be limited to a certain range for component protection and engine performance. Low pressures are sometimes avoided to prevent high oil consumption and poor combustion quality.

The desired mass flow through the air throttle 408 can be calculated at block 522 using the following exemplary method. The intake manifold pressure lean error is the difference between the desired intake manifold lean pressure and the intake manifold pressure estimate:

$$P_{im\_lean\_error} = P_{im\_lean\_des} - P_{im} \quad (54)$$

The error can be multiplied by the proportional gain to determine the closed loop term:

$$\dot{m}_{at\_cl} = K_{p\_im} \cdot P_{im\_lean\_error} \quad (55)$$

The desired air throttle mass flow is the sum of the feed forward term from equation (47) and the closed loop term from equation (55):

$$\dot{m}_{at\_des} = \dot{m}_{at\_ff} + \dot{m}_{at\_cl} \quad (56)$$

Figure 6:
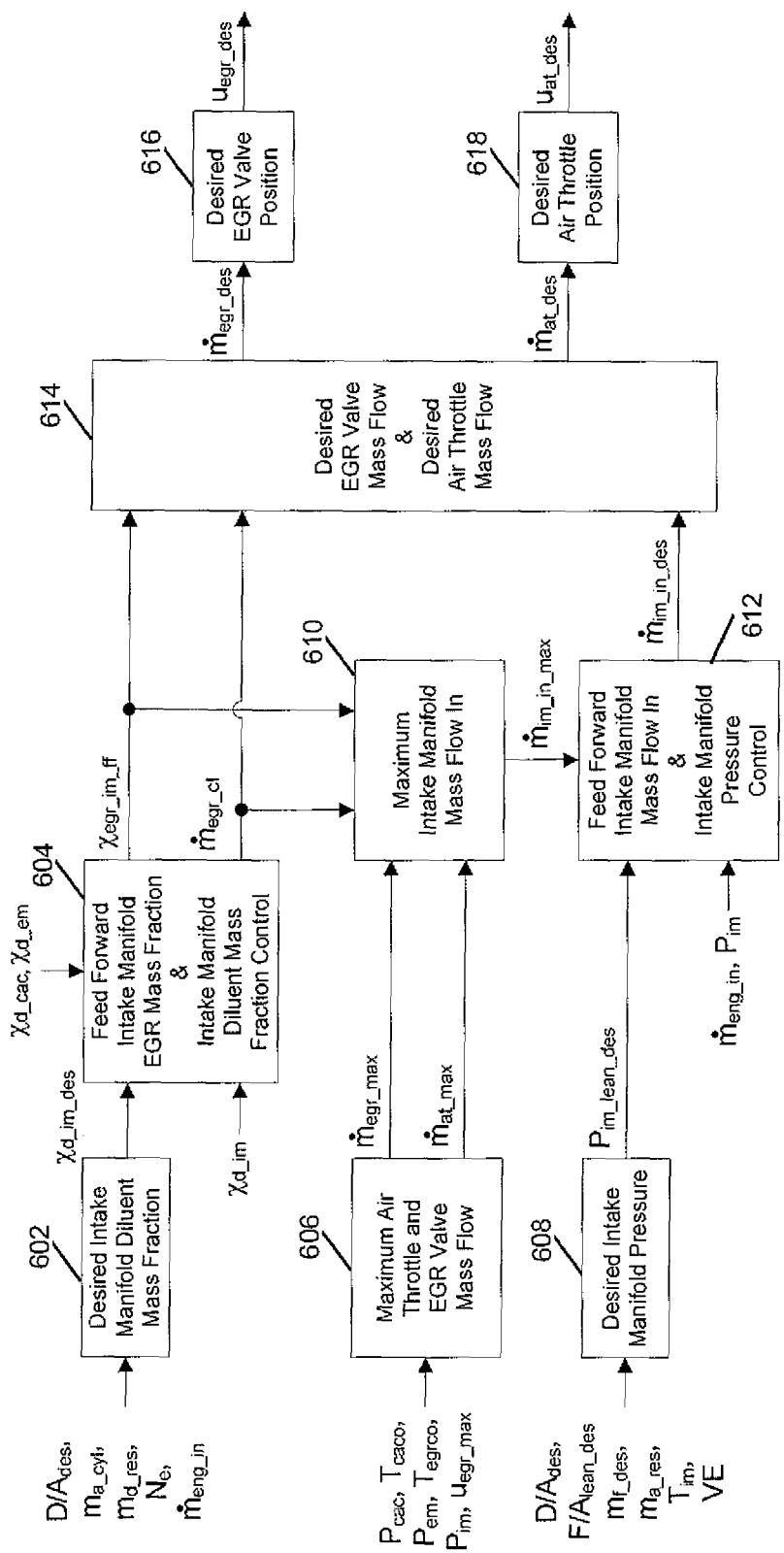
FIG. 6 illustrates another exemplary method for calculating desired EGR valve and air throttle positions.

The control described above and shown in FIG. 5 uses the EGR valve 414 to control the intake manifold diluent mass fraction and the air throttle 408 to control the intake manifold pressure. Under transient conditions when there is insufficient engine delta pressure to provide the required EGR mass flow the resulting intake manifold diluent mass fraction may be too low. An alternative control strategy can be used to resolve this issue by using the air throttle 408 to control the fresh air flow entering the intake manifold 416 when needed to achieve the desired intake manifold diluent mass fraction. This is different in that it calculates the maximum mass flow for the air throttle 408 and EGR valve 414, then determines the maximum combined flow that is possible while achieving the desired intake manifold diluent mass fraction. With this method, the intake manifold pressure is controlled by calculating a combined mass flow term that is within the maximum limit. The individual mass flows for the air throttle 408 and the EGR valve 414 are then calculated as shown in FIG. 6. Many of the calculations are the same as described above, and the differences are described below.

The desired intake manifold diluent mass fraction can be calculated at block 602 using the method disclosed with equation (40). The feed forward intake manifold EGR mass fraction can be calculated at block 604 using the method disclosed with equation (42). The closed loop EGR mass flow can be calculated at block 604 using the method disclosed with equation (45). The desired intake manifold pressure can be calculated at block 608 using the method disclosed with equation (53).

The maximum air throttle and EGR valve mass flows can be calculated at block 606 using the maximum air throttle and EGR valve positions in equation (12) and (13), and equations (21) and (22). An iterative process can be used to find the mass flow since the corresponding cooler outlet pressure must be found that provides the same flow through the actuator and cooler. A similar iterative process can be used to the one described above for the charge air and EGR cooler mass flows for the observer, except that the maximum actuator position could be used instead of the current actuator position. The maximum actuator position does not have to correspond to a wide open valve position. The maximum actuator position may be calibrated to a value less than wide open under some operating conditions.

The maximum mass flow rate at the intake manifold 416 can be based on the EGR valve mass flow limit calculated using the maximum EGR valve position in equation (13), equation (22), the closed loop EGR mass flow term from equation (45), and the feed forward intake manifold EGR mass fraction from equation (42) as:

$$\dot{m}_{im\_in\_max\_egr\_ltd} = \frac{\dot{m}_{egr\_max} - \dot{m}_{egr\_cl}}{\chi_{egr\_im\_ff}} \quad (57)$$

The closed loop EGR mass flow is subtracted from the maximum EGR valve mass flow to help ensure there is room to add it later as shown in equation (63).

The maximum intake manifold mass flow based on the air throttle mass flow limit can be calculated using the maximum air throttle position in equation (12), equation (21), the closed loop EGR mass flow term from equation (45), and the feed forward intake manifold EGR mass fraction from equation (42) as:

$$\dot{m}_{im\_in\_max\_at\_ltd} = \frac{\dot{m}_{at\_max} + \dot{m}_{egr\_cl}}{(1 - \chi_{egr\_im\_ff})} \quad (58)$$

The closed loop EGR mass flow is added to the maximum air throttle mass flow because later it will be subtracted as shown in equation (64).

The maximum intake manifold mass flow can be calculated at block 610 as the minimum of the two values calculated by equations (57) and (58):

$$\dot{m}_{im\_in\_max} = \min(\dot{m}_{im\_in\_max\_egr\_ltd}, \dot{m}_{im\_in\_max\_at\_ltd}) \quad (59)$$

The feed forward intake manifold mass flow term can be equated to the engine in mass flow estimate:

$$\dot{m}_{im\_in\_ff} = \dot{m}_{eng\_in} \quad (60)$$

The closed loop intake manifold mass flow term can be estimated as a proportional gain times the intake manifold pressure lean error that was calculated in equation (54):

$$\dot{m}_{im\_in\_cl} = K_{p\_im} \cdot P_{im\_lean\_error} \quad (61)$$

The desired intake manifold mass flow in calculated at block 612 can be estimated as the sum of the feed forward term and the closed loop term:

$$\dot{m}_{im\_in\_des} = \dot{m}_{im\_in\_ff} + \dot{m}_{im\_in\_cl} \quad (62)$$

The desired EGR valve mass flow and air throttle mass flow can be calculated at block 614 from the desired intake manifold mass flow as:

$$\dot{m}_{egr\_des} = \dot{m}_{im\_in\_des} \cdot \chi_{egr\_im\_ff} + \dot{m}_{egr\_cl} \quad (63)$$

$$\dot{m}_{at\_des} = \dot{m}_{im\_in\_des} \cdot (1 - \chi_{egr\_im\_ff}) - \dot{m}_{egr\_cl} \quad (64)$$

The feed forward intake manifold EGR mass fraction and the closed loop EGR mass flow terms do not affect the total mass flow entering the manifold, only the split between the EGR valve and the air throttle.

The desired position for the air throttle 408 and the desired position for the EGR valve 414 can be calculated from the desired flow rate for each actuator. The cooler inlet pressure and intake manifold pressure can be used in each case.

For the air throttle 408, the pressure drop across the CAC 406 can be evaluated using equation (21). This can be done by searching the CACMassFlowSquaredOverDensityTable described above to find the delta pressure that gives the desired mass flow. Alternatively, a separate table can be used with delta pressure as the output and mass flow squared over density as one of the inputs. The outlet pressure of the CAC 406 can then be calculated by subtracting this pressure drop from the CAC inlet pressure.

The pressure ratio across the air throttle 408 can be calculated by dividing the pressure of the intake manifold 416 by the outlet pressure of the CAC 406. Equation (12) can then be used to solve for the discharge coefficient $C_{d\_at}$. The discharge coefficient $C_{d\_at}$ is related to actuator position $u_{at}$. A table defining this relationship was described for equation (12) of the observer model. The table for equation (12) could have two columns ($u_{at}$ and $C_{d\_at}$), where $u_{at}$ is the input and $C_{d\_at}$ is the output. For the feed forward calculation a similar table can be used, but in this case $C_{d\_at}$ is the input and $u_{at}$ is the output.

For the EGR valve 414, the pressure drop across the EGR cooler 412 can be evaluated using equation (22). This can be done by searching the EGRCMassFlowSquaredOverDensityTable described above to find the delta pressure that gives the desired mass flow. Alternatively, a separate table can be used with delta pressure as the output and mass flow squared over density as one of the inputs. The outlet pressure of the EGR cooler 412 can then be calculated by subtracting this pressure drop from the EGR cooler inlet pressure.

The pressure ratio across the EGR valve 414 can be calculated by dividing the pressure of the intake manifold 416 by the outlet pressure of the EGR cooler 412. Equation (13) can then be used to solve for the discharge coefficient $C_{d\_egr}$. The discharge coefficient $C_{d\_egr}$ is related to actuator position $u_{egr}$. A table defining this relationship was described for equation (13) of the observer model. The table for equation (13) could have two columns ($u_{egr}$ and $C_{d\_egr}$), where $u_{egr}$ is the input and $C_{d\_egr}$ is the output. For the feed forward calculation a similar table can be used, but in this case $C_{d\_egr}$ is the input and $u_{egr}$ is the output.

Within these calculations the desired mass flows can be modified by dividing by the corresponding mass flow correction factors that were calculated for the air system observer. This allows the correct position to be calculated for the desired mass flow.

The turbocharger control can provide sufficient exhaust pressure to achieve a desired EGR mass flow and provide sufficient intake manifold pressure to achieve a desired fuel-to-air ratio. The vanes on the turbocharger can be adjusted to regulate the mass flow through the turbine. Moving the vanes in the closing direction tends to reduce the mass flow, increase the exhaust manifold pressure, and increase the turbine power. A flow based strategy can be used with the turbocharger control. The desired turbine mass flow can be calculated and then the turbocharger maps can be used to calculate the vane position needed to achieve the desired mass flow.

Figure 7:
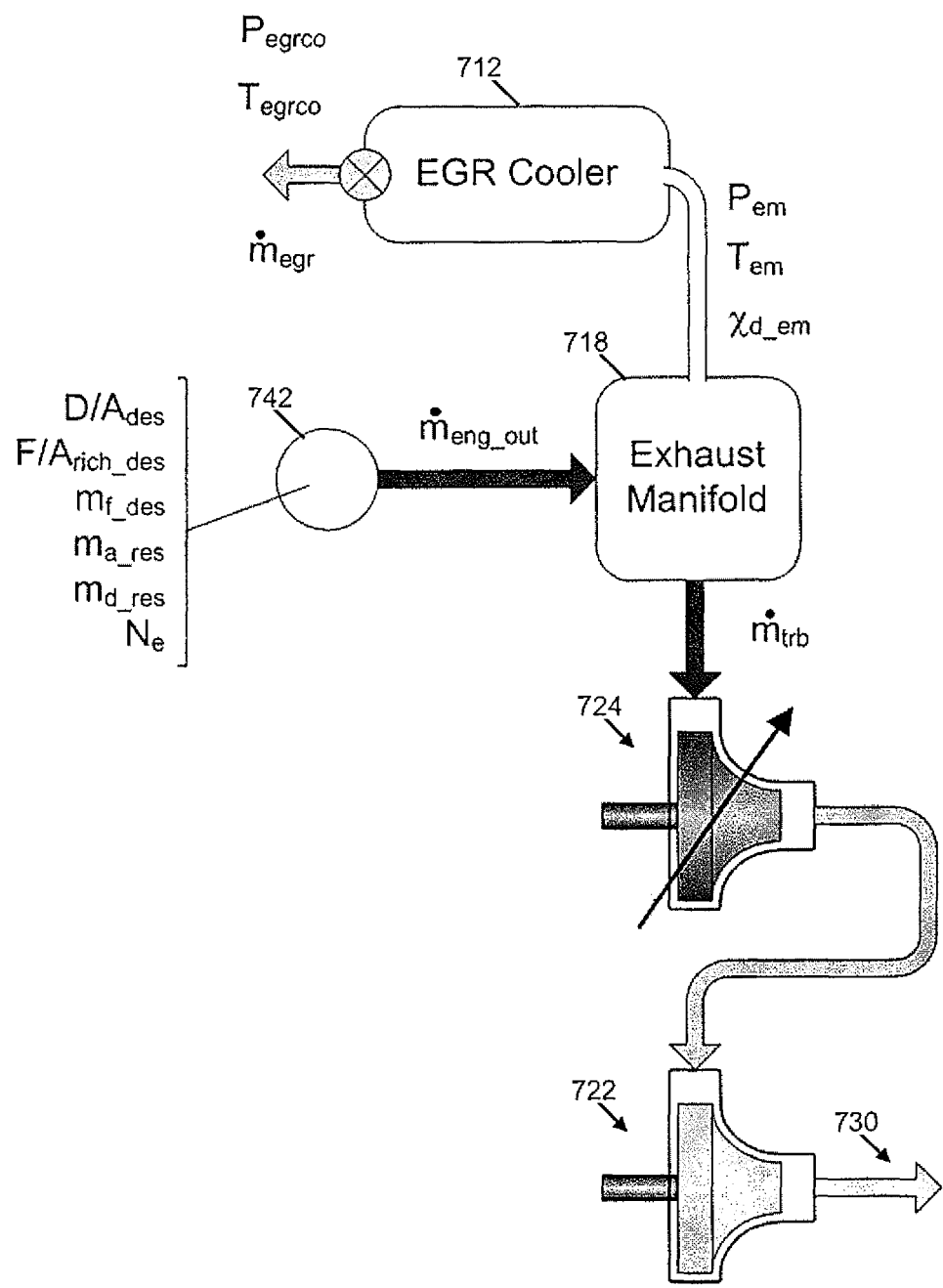
FIG. 7 illustrates an exemplary turbocharger control model.

FIG. 7 illustrates an exemplary turbocharger control schematic 700 which includes a cylinder 742, an exhaust manifold 718, an EGR cooler 712, a high pressure variable geometry turbocharger 724, a low pressure variable turbine 722 and an exhaust outlet 730. Only one cylinder 742 is shown for clarity but the engine would include multiple cylinders 742 and the output from the multiple cylinders 742 would be input to the exhaust manifold 718. The vanes of the variable geometry turbocharger 724 can be adjusted to control the EGR flow and fresh air flow.

Figure 8:
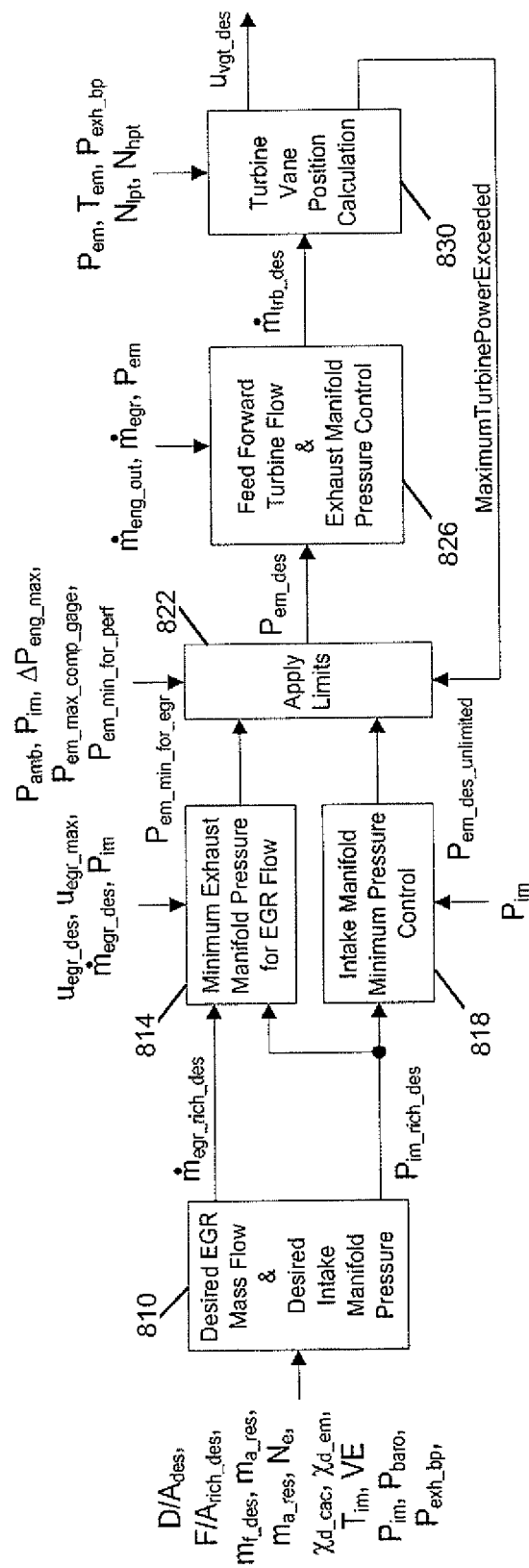
FIG. 8 illustrates an exemplary method for calculating turbocharger vane positions.

FIG. 8 illustrates an exemplary turbocharger vane position control model. At block 810, the desired EGR rich mass flow and desired intake manifold pressure rich setpoint are calculated. At block 814, the minimum exhaust manifold pressure to achieve the desired EGR rich mass flow is calculated. An integral controller can be used to regulate the intake manifold pressure at block 818 by adjusting the exhaust manifold pressure. At block 822, the desired exhaust manifold pressure is limited to the minimum pressure calculated for EGR mass flow. At block 826, the turbine mass flow to achieve that pressure is calculated. Finally, at block 830, the vane position is calculated.

The feed forward term for the turbine mass follow can be calculated by subtracting the EGR mass flow from the engine out mass flow.

$$\dot{m}_{trb\_ff} = \dot{m}_{eng\_out} - \dot{m}_{egr} \quad (65)$$

This turbine flow will tend to keep the exhaust manifold pressure constant. The closed loop term is used to make changes in pressure.

The desired EGR mass flow at block 810 can be calculated by first calculating the desired exhaust manifold pressure. The desired air mass and diluent mass in-cylinder can be calculated as:

$$m_{a\_cyl\_rich\_des} = \frac{m_{f\_des}}{F/A_{rich\_des}} \quad (66)$$

$$m_{a\_cyl\_rich\_des} = m_{a\_cyl\_rich\_des} \cdot D/A_{des} \quad (67)$$

The desired mass of air, diluent, and total mass entering the cylinder can be calculated using the desired in-cylinder values and the residual values $$m_{a\_cyl\_in\_rich\_des} = m_{a\_cyl\_rich\_des} - m_{a\_res} \quad (68)$$

$$m_{d\_cyl\_in\_rich\_des} = m_{d\_cyl\_rich\_des} - m_{d\_res} \quad (69)$$

$$m_{cyl\_in\_rich\_des} = m_{a\_cyl\_in\_rich\_des} + m_{d\_cyl\_in\_rich\_des} \quad (70)$$

The desired intake manifold rich diluent mass fraction can be calculated by dividing the desired cylinder in rich diluent mass by the desired cylinder in rich mass.

$$\chi_{d\_im\_rich\_des} = \frac{m_{d\_cyl\_in\_rich\_des}}{m_{cyl\_in\_rich\_des}} \quad (71)$$

The desired intake manifold rich diluent mass fraction can be related to the desired intake manifold rich EGR mass fraction by:

$$\chi_{d\_im\_rich\_des} = \chi_{d\_em} \chi_{egr\_im\_rich\_des} + \chi_{d\_cac} \cdot (1 - \chi_{egr\_im\_rich\_des}) \quad (72)$$

The mass fraction of diluent in the charge air cooler is used in this calculation to account for water vapor that may enter with the fresh air. Water vapor is considered a diluent. Equation (72) can be rearranged to solve for the desired intake manifold rich EGR mass fraction as:

$$\chi_{egr\_im\_rich\_des} = \frac{\chi_{d\_im\_rich\_des} - \chi_{d\_cac}}{\chi_{d\_em} - \chi_{d\_cac}} \quad (73)$$

The desired engine in rich mass flow is calculated using the desired cylinder in rich mass, number of cylinders, and engine speed as:

$$\dot{m}_{eng\_in\_rich\_des} = m_{cyl\_in\_rich\_des} \cdot n_{cyl} \cdot N_e(\text{rpm}) \cdot \left(\frac{\min}{60 \sec}\right) \cdot \left(\frac{\text{cycle}}{2 \text{ rev}}\right) \quad (74)$$

The desired rich EGR mass flow can then be calculated by multiplying the desired intake manifold rich EGR mass fraction by the desired engine in rich mass flow as:

$$\dot{m}_{egr\_rich\_des} = \chi_{egr\_im\_rich\_des} \dot{m}_{eng\_in\_rich\_des} \quad (75)$$

At block 814, the minimum exhaust manifold pressure is found that provides the desired EGR mass flow. When the desired EGR valve position $u_{egr\_des}$ is less than the maximum $u_{egr\_max}$, then there is sufficient exhaust manifold pressure for EGR flow control with the EGR valve. Under this condition, the minimum exhaust manifold pressure limit can be calculated using the desired EGR rich mass flow and desired intake manifold pressure rich setpoints. The exhaust pressure calculation can take the desired rich intake manifold pressure and add the calculated pressure drop across the EGR cooler and EGR valve (with the EGR valve at its maximum position).

When the EGR valve is at the maximum position $u_{egr\_max}$, then the EGR valve is not controlling the flow and the flow can be controlled by regulating the exhaust pressure. Under this condition, the desired EGR valve mass flow from the EGR valve control calculation can be used with the current intake manifold pressure estimate to calculate the required exhaust manifold pressure.

An exemplary calculation for the minimum exhaust manifold pressure under the two conditions described above is:

If $u_{egr\_des} < u_{egr\_max}$ (76)

$P_{em\_min\_for\_egr}$=ExhManifPressMinForEGR
$(\dot{m}_{egr\_rich\_des}, P_{im\_rich\_des})$ Else $P_{em\_min\_for\_egr}$=ExhManifPressMinForEGR$(\dot{m}_{egr\_des}, P_{im})$ The desired intake manifold pressure can be determined at block 810 by computing the pressure needed to achieve the desired engine in mass flow which can be found using the ideal gas law and the volumetric efficiency as:

$$P_{im\_rich\_des} = \frac{n_{cyl} \cdot m_{cyl\_in\_rich\_des} \cdot R \cdot T_{im}}{V_d \cdot VE} \quad (77)$$

This equation is related to the speed-density calculation but does not account for speed because the mass per cylinder is used instead of a mass flow. The desired intake manifold rich pressure may be limited to a certain range for component protection and engine performance. Low pressures are sometimes avoided to prevent high oil consumption and poor combustion quality.

At block 818, the error in intake manifold rich pressure can be calculated as the difference between the desired intake manifold rich pressure and the estimated intake manifold pressure by:

$P_{im\_rich\_error} = P_{im\_rich\_des} - P_{im}$ (78)

This pressure error can be multiplied by the integral gain and added to the previous desired exhaust manifold pressure to determine the unlimited desired exhaust manifold pressure before the pressure limits are applied as:

$P_{em\_des\_unlimited} = K_{i\_im} \cdot P_{im\_rich\_error} + P_{em\_des\_previous}$ (79)

At block 822, the unlimited desired exhaust manifold pressure may be Limited by minimum pressure limits to the minimum exhaust manifold pressure for EGR from equation (76), and may also have a calibrate-able minimum limit for engine performance:

$P_{em\_des\_min\_limited}$=maximum$(P_{em\_des\_unlimited}, P_{em\_min\_for\_egr}, P_{em\_min\_for\_perf})$ (79A)

Keeping the exhaust manifold pressure higher than necessary at low load can improve the transient response of the engine because the turbocharger speed is higher before the load is applied. This improvement in transient response performance comes with a reduction in fuel economy because the higher exhaust manifold pressure creates more pumping work for the engine.

The desired exhaust manifold pressure may be reduced when it is determined that controlling to a lower exhaust manifold pressure produces more turbine power. As the exhaust manifold pressure increases, the turbine vanes move in the closing direction to achieve the desired turbine mass flow. As the turbine vanes move in the closing direction the angle at which the gasses enter the turbine changes. For a given set of operating conditions and turbocharger speed there will be an optimum turbine vane position that maximizes turbine power. Closing the vanes more than what is optimum for maximum turbine power increase the exhaust manifold pressure, increases engine pumping work, reduces fuel economy, and reduces turbine power. When it is determined that operating at a lower exhaust manifold pressure produces more turbine power as described below, the desired exhaust manifold pressure can be calculated by taking the previous desired exhaust manifold pressure and subtracting a small calibrate-able value. Since this reduction in pressure occurs at each time step in the software the desired exhaust manifold pressure is reduced over time in the form of a ramp.

If Maximum_Turbine_Power_Exceeded (79B)

$P_{em\_des\_trb\_pwr\_limited} = P_{em\_des\_previous} - \Delta P_{em\_ramp\_trb\_pwr\_exceeded}$ Else $P_{em\_des\_trb\_pwr\_limited} = P_{em\_des\_min\_limited}$ The desired exhaust manifold pressure may also be constrained by a maximum engine delta pressure limits for engine protection. Engine delta pressure is the difference between the exhaust manifold pressure and intake manifold pressure. If the engine delta pressure becomes too large, the exhaust pressure can push the exhaust valve open during the intake stroke of the engine which is called valve float. A maximum exhaust manifold pressure limit for engine delta pressure protection can be calculated as:

$P_{em\_max\_for\_eng\_dp} = P_{im} + \Delta P_{eng\_max}$ (79C)

The desired exhaust manifold pressure may also be constrained by a maximum pressure limit for component protection (to protect turbocharge seals, exhaust manifold gaskets, etc.). This pressure limit can be calculated using the ambient (barometric) pressure and the gage pressure limit for the exhaust manifold components as:

$P_{em\_max\_for\_comp} = P_{amb} + P_{em\_max\_comp\_gage}$ (79D)

The desired exhaust manifold pressure can be calculated by taking the minimum of the turbine power limited desired exhaust manifold pressure, the maximum pressure for engine delta pressure protection, and the pressure limit for component protection:

$P_{em\_des}$=minimum$(P_{em\_des\_trb\_pwr\_limited}, P_{em\_max\_for\_eng\_dp}, P_{em\_max\_for\_comp})$ (79D)

In addition to the magnitude limits described here, rate limits can also be applied to prevent sudden changes to the desired exhaust manifold pressure that would cause large transient changes to the desired turbine mass flow and large transient changes to the desired turbine vane position.

The closed loop turbine mass flow can be calculated by first calculating the exhaust manifold pressure error as:

$P_{em\_error} = P_{em\_des} - P_{em}$ (80)

where $P_{em}$ is the exhaust manifold pressure estimate from the observer. The estimate can be used instead of the measured value since the measured value may have lag due to the sensor response time and any filtering that may be used to reduce signal noise, and the estimated value may continue to be used if a sensor fails. Alternatively, pressure sensors can respond fast compared to the air system response so using the measured pressure instead of the estimate can be done with similar results. The exhaust manifold pressure error can be multiplied by the proportional gain to determine the closed loop term by:

$$\dot{m}_{trb\_cl} = -K_{p\_em} \cdot P_{em\_error} \tag{81}$$

The negative sign is used because turbine flow has to go down to increase exhaust manifold pressure. This allows a positive gain to be used in calculating the closed loop turbine mass flow. The desired turbine mass flow is the sum of the feed forward term and the closed loop term:

$$\dot{m}_{trb\_des} = \dot{m}_{trb\_ff} + \dot{m}_{trb\_cl} \tag{82}$$

The control method described above and illustrated in FIG. 8 is intended for use when the desired lean F/A setpoint is less than the desired rich F/A setpoint. This results in the air throttle attempting to maintain a higher intake manifold pressure than the turbine vane position control. This separation can create a control band in which both the air throttle and turbine vanes move in the opening direction. Under steady state conditions the air throttle typically moves to the maximum position, which minimizes the pumping work across the air throttle.

When the desired lean F/A setpoint is greater than or equal to the desired rich F/A setpoint, a different control method can be used to prevent the air throttle and turbine vane controls from conflicting. Without the intake manifold pressure setpoint separation, the air throttle control and turbine vane control may oscillate or the air throttle may close completely. This problem can be overcome by using the turbine vanes to control the charge air cooler pressure instead of using the turbine vanes to control the intake manifold pressure.

In this situation, the desired air throttle rich mass flow and the desired charge air cooler pressure can be calculated first. The desired air throttle rich mass flow can be calculated using the desired intake manifold rich FGR mass fraction and the desired engine in rich mass flow as:

$$\dot{m}_{at\_rich\_des} = (1 - \chi_{egr\_im\_rich\_des}) \cdot \dot{m}_{eng\_in\_rich\_des} \tag{83}$$

The desired charge air cooler rich pressure can be estimated by the desired intake manifold rich pressure and the pressure drop across the air throttle and charge air cooler. This calculation can be shown as a function by:

$$P_{cac\_rich\_des} = \text{DesCACPress}(u_{at\_max}, \dot{m}_{at\_rich\_des}, P_{im\_rich\_des}, T_{caci}, T_{caco}) \tag{84}$$

This function has two parts. First, equation (12) can be used to find the desired charge air cooler outlet pressure that provides the desired mass flow through the air throttle. Then equation (21) can be used to find the charge air cooler inlet pressure that is sufficient to overcome the pressure drop across the charge air cooler. The maximum air throttle position $u_{at\_max}$ can be used since it minimizes the pumping work across the air throttle. These equations can be solved by an iterative solution method to determine the desired charge air cooler rich pressure.

The charge air cooler pressure rich error is the difference between the desired charge air cooler rich pressure and the estimated charge air cooler pressure:

$$P_{cac\_rich\_error} = P_{cac\_rich\_des} - P_{cac} \tag{85}$$

This error can be multiplied by the integral gain and added to the previous desired exhaust manifold pressure to determine the desired exhaust manifold pressure as:

$$P_{em\_des} = K_{i\_cac} \cdot P_{cac\_rich\_error} + P_{em\_des\_previous} \tag{86}$$

The desired exhaust manifold pressure can then be limited to the minimum value calculated by equation (76), and it may also be limited to a certain range for component protection and engine performance. The desired exhaust manifold pressure can then be used to calculate the desired turbine mass flow as shown by equations (80) through (82).

The desired turbine vane position $u_{vgt\_des}$ can be calculated using the desired turbine mass flow $\dot{m}_{trb\_des}$ and the state information for the observer model. The state information can include, for example, exhaust manifold pressure, exhaust manifold temperature, exhaust back pressure, high pressure turbocharger speed, and low pressure turbocharger speed.

Figure 9:
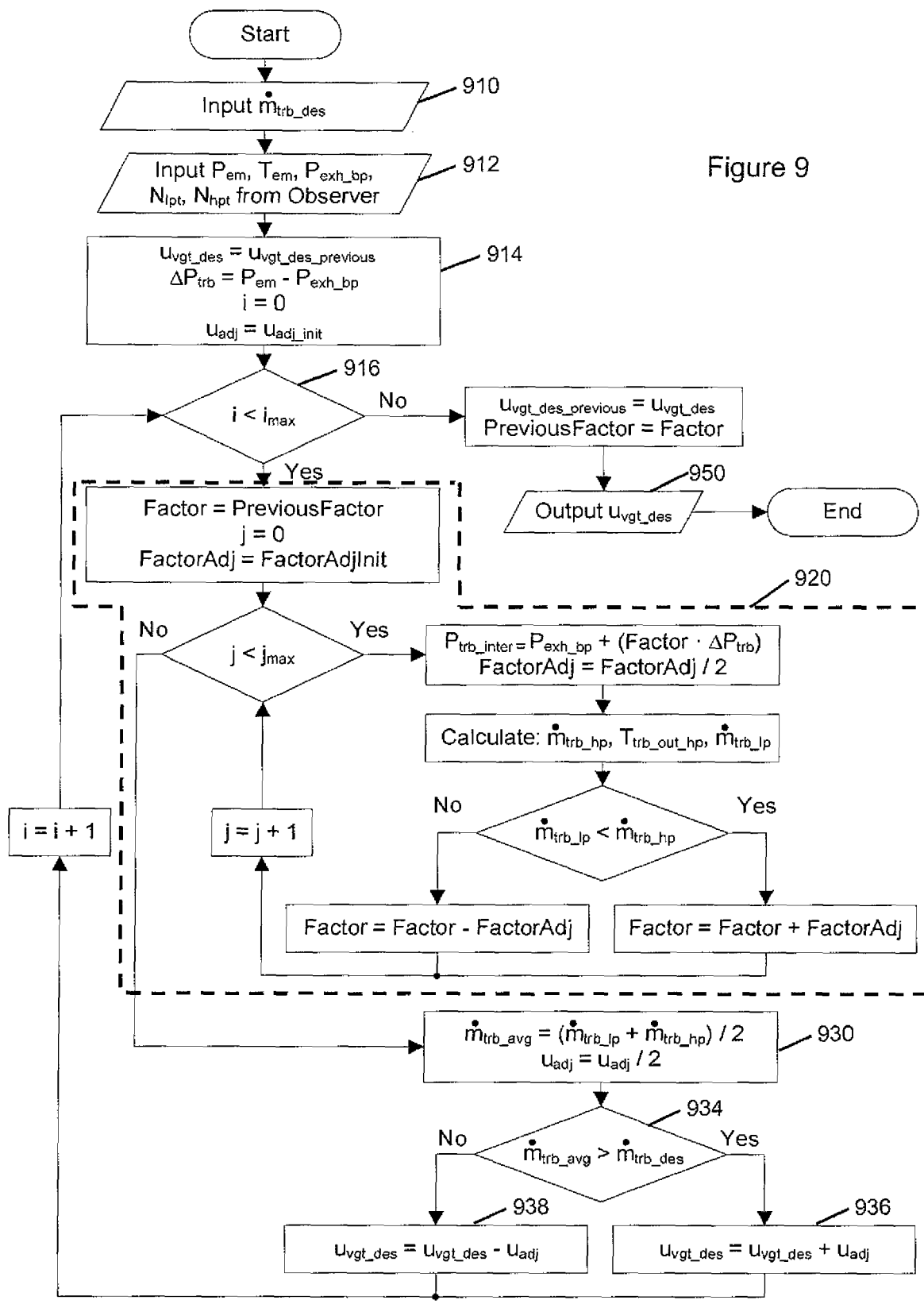
FIG. 9 illustrates an exemplary two dimensional binary search for finding turbine interstage pressure and desired vane position for a given turbine mass flow.

The interstage pressure between the high and low pressure turbines 724, 722 can also be determined in finding the vane position $u_{vgt\_des}$ that provides the desired turbine mass flow $\dot{m}_{trb\_des}$. The turbine interstage pressure and desired vane position can be found for a given turbine mass flow using a two dimensional binary search, an example of which is shown in FIG. 9.

At block 910, the desired turbine mass flow $\dot{m}_{trb\_des}$ from equation (82) is input. At block 912, the exhaust manifold pressure and temperature, the exhaust back pressure, and the speeds of the low and high pressure turbines 724, 722 are input. At block 914, the current desired vane position is set to the desired vane position from the calculation that was performed at the previous time step, the turbine delta pressure is set to the difference between the exhaust manifold pressure and the exhaust back pressure, and a search index and vane adjustment value are initialized. Block 916 is an outer loop check that allows $i_{max}$ iterations of the outer loop. Block 920 is an inner loop that performs $j_{max}$ iterations adjusting the turbine interstage pressure to find a resulting turbine interstage pressure for the current desired vane position that provides the same or closest to the same mass flow through each of the turbines 724, 722. This step is similar to the search described in [0052] for the observer model but in this case the model is being used to evaluate a possible vane position rather than the final desired vane position. At block 930, the outer loop takes the mass flows through each of the turbines 724, 722, and calculates an average turbine mass flow by averaging the high and low pressure turbine mass flows. At block 930, the outer loop also fine tunes the turbine position adjustment step. At block 934, the average turbine mass flow is compared with the desired turbine mass flow. If the average turbine mass flow is too high, then at block 936 the current desired vane position is adjusted in the closing direction (increasing $u_{vgt\_des}$). Otherwise, at block 938 the current desired vane position is adjusted in the opening direction (decreasing $u_{vgt\_des}$). Control returns to block 916, and the process is repeated as part of the binary search. After all the iterations of the outer loop are complete, at block 950 the final desired vane position $u_{vgt\_des}$ that provides the desired turbine mass flow $\dot{m}_{trb\_des}$ is output. This process can be repeated with percentage adjustments to the vane position of, for example, 4, 2, 1, 0.5 and 0.25 percent.

The modeled mass flow through the high and low pressure turbines 724, 722 in the search for the desired vane position can each be corrected using the turbine mass flow correction factor shown in equation (30). This allows the turbine vane position to be determined with modeled flow correction so that the desired turbine mass flow is achieved.

The turbine interstage temperature can be assumed to be equal to the high pressure turbine outlet temperature, which can be calculated using the turbine efficiency, pressure ratio across the high pressure turbine, and the exhaust manifold temperature. The efficiency can be determined using tables with inputs of corrected turbocharger speed and pressure ratio. The turbocharger speed can be adjusted using a correction factor to compensate for operating with exhaust manifold temperatures that are different than the reference temperature used when creating the efficiency table. Efficiency tables can be generated for different vane positions and interpolation can be used when the vane position is between two of the provided tables. The turbine interstage pressure and temperature can be used to calculate the low pressure turbine mass flow.

For a given turbine mass flow rate and turbocharger speed there will be an optimum turbine vane position that maximizes turbine power. This vane position will provide the best combination of flow velocity and flow angle for the exhaust gas as it enters the turbine blades. Opening the vanes more than the maximum turbine power point causes lower velocity, less optimum flow angle, and less turbine power but it also reduces the exhaust manifold pressure which tends to reduce engine pumping work. For normal control when the maximum turbine power is not needed the vanes are typically positioned more open than the maximum turbine power point because this reduces the engine pumping work.

Closing the vanes more than the maximum turbine power point causes higher velocity but the flow angle is less optimum, there is less turbine power, and the exhausts manifold pressure is higher. This region of operation is typically avoided. One exception is when there is a need to raise the exhaust temperature for after-treatment system control. In this case, the increase in pumping work is beneficial because it puts additional load on the engine. The extra load on the engine requires more fuel to be consumed, raising the exhaust temperature.

For normal control it is desirable to have the turbine vanes between the maximum turbine power position and wide open. When calculating the desired vane position for a desired turbine mass flow, exhaust manifold pressure, and turbocharger speed as described above, a check can also be performed to see if the maximum turbine power has been exceeded. When this happens it means the desired exhaust manifold pressure is too high.

This maximum turbine power check can be performed after the vane position calculation described above to see if controlling to a slightly lower exhaust manifold pressure (5 kPa lower for example) would provide more turbine power. If the turbine power is higher with reduced exhaust manifold pressure that means the exhaust manifold pressure for maximum turbine power has been exceeded. When the maximum turbine power is exceeded, the desired exhaust manifold pressure can be reduced at a calibrate-able rate until the maximum turbine power is no longer exceeded, as shown by equation (79B).

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A variable geometry turbocharger control method for an engine having a variable geometry turbocharger having adjustable vanes, an exhaust gas recirculation (EGR) valve, an intake manifold, a charge air cooler, and an exhaust manifold, the control method comprising:
    monitoring parameters of the engine in an operational state using a plurality of sensors, the plurality of sensors including an intake manifold pressure sensor and an exhaust manifold pressure sensor;
    generating engine state estimates using an engine observer model, the engine observer model representing the intake manifold volume, the exhaust manifold volume, and the charge air cooler volume, the engine state estimates based on the monitored engine parameters from the plurality of sensors;
    calculating a turbine intake correction factor based on the differences between the measured engine states and the engine state estimates and inputting the turbine intake correction factor to the engine observer model;
    determining a desired turbocharger vane position based on setpoint commands, the monitored engine parameters, the turbine intake correction factor, and the engine state estimates; and
    adjusting positions of the vanes of the variable geometry turbocharger based on the desired turbocharger vane position.

2. The variable geometry turbocharger control method of claim 1, wherein the plurality of sensors excludes a mass air flow sensor.

3. The variable geometry turbocharger control method of claim 1, wherein the variable geometry turbocharger includes a compressor and a turbine, the method further comprising generating a turbocharger rotational speed estimate using a turbocharger model, and wherein the determining a desired turbocharger vane position includes determining a desired turbocharger vane position based on the turbocharger rotational speed estimate.

4. The variable geometry turbocharger control method of claim 3, and wherein the turbocharger rotational speed estimate is used to estimate a flow through the turbine.

5. The variable geometry turbocharger control method of claim 4, and wherein the turbocharger rotational speed estimate is used to estimate a flow through the compressor.

6. The variable geometry turbocharger control method claim of 1, wherein generating engine state estimates using an engine observer model includes generating estimates of the inlet and outlet flows of each of the intake manifold volume, exhaust manifold volume, and charge air cooler volume.

7. The variable geometry turbocharger control method of claim 1, further comprising:
    calculating a fresh air flow correction factor based on the differences between the measured engine states and the engine state estimates and inputting fresh air flow correction factor to the engine observer model;
    wherein the determining a desired turbocharger vane position includes determining a desired turbocharger vane position based on the fresh air flow correction factor.

8. The variable geometry turbocharger control method of claim 1, further comprising:

calculating an incremental EGR correction factor based on the differences between the measured engine states and the engine state estimates and inputting the incremental EGR correction factor to the engine observer model, wherein the determining a desired turbocharger vane position includes determining a desired turbocharger vane position based on the incremental EGR correction factor.

9. The variable geometry turbocharger control method of claim 8, wherein the turbine intake correction factor is applied to a feed forward determination of the desired turbocharger vane position.

10. The variable geometry turbocharger control method of claim 1, the method further comprising:

calculating a minimum exhaust manifold pressure based on a desired EGR mass flow at a maximum EGR valve open position.

11. The variable geometry turbocharger control method of claim 10, the method further comprising:

calculating a desired EGR valve position and, when the calculated desired EGR valve position is not less than the maximum EGR valve open position, further calculating a minimum exhaust manifold pressure based on a desired EGR mass flow, maximum EGR valve open position, and a current intake manifold pressure.

* * * * *